United States Patent
Kawano et al.

(10) Patent No.: US 11,301,615 B2
(45) Date of Patent: Apr. 12, 2022

(54) INFORMATION PROCESSING DEVICE USING RECOGNITION DIFFICULTY SCORE AND INFORMATION PROCESSING METHOD

(71) Applicant: Sony Corporation, Tokyo (JP)

(72) Inventors: Shinichi Kawano, Tokyo (JP); Yuhei Taki, Kanagawa (JP); Masaki Takase, Tokyo (JP); Akira Miyashita, Kanagawa (JP); Naoki Tokiwa, Tokyo (JP); Nodoka Tokunaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 16/605,805

(22) PCT Filed: Jan. 23, 2018

(86) PCT No.: PCT/JP2018/001918
§ 371 (c)(1),
(2) Date: Oct. 17, 2019

(87) PCT Pub. No.: WO2018/198447
PCT Pub. Date: Nov. 1, 2018

(65) Prior Publication Data
US 2020/0125788 A1    Apr. 23, 2020

(30) Foreign Application Priority Data
Apr. 24, 2017  (JP) .............................. JP2017-085416

(51) Int. Cl.
G06F 40/103    (2020.01)
G10L 15/26     (2006.01)

(52) U.S. Cl.
CPC ............ G06F 40/103 (2020.01); *G10L 15/26* (2013.01)

(58) Field of Classification Search
CPC ...................................................... G06F 40/103
See application file for complete search history.

(56) References Cited

U.S. PATENT DOCUMENTS

| 9,741,258 | B1 * | 8/2017 | Chetlur | ................. G09B 5/12 |
| 2008/0167861 | A1 * | 7/2008 | Inoue | ..................... A61B 5/16 |
| | | | | 704/206 |

(Continued)

FOREIGN PATENT DOCUMENTS

| JP | 2013-109687 A | 6/2013 |
| JP | 2016-143310 A | 8/2016 |
| WO | 2014/207903 A1 | 12/2014 |

OTHER PUBLICATIONS

International Search Report and Written Opinion dated May 1, 2018 for PCT/JP2018/001918 filed on Jan. 23, 2018, 8 pages including English Translation of the International Search Report.

*Primary Examiner* — Scott T Baderman
*Assistant Examiner* — Seung Woon Jung
(74) *Attorney, Agent, or Firm* — Xsensus LLP

(57) ABSTRACT

[Object] To achieve displaying of a text in a more flexible and highly readable manner in accordance with a situation. [Solution] According to the present disclosure, an information processing device is provided. The information processing device includes a calculator that calculates, on the basis of context data to be entered, a recognition difficulty score used for display control of a target text. An information processing method is further provided. The information processing method includes allowing a processor to calculate, on the basis of context data to be entered, a recognition difficulty score used for display control of a target text.

16 Claims, 21 Drawing Sheets

(56) References Cited

U.S. PATENT DOCUMENTS

| | | | |
|---|---|---|---|
| 2013/0100139 A1* | 4/2013 | Schliesser | G06T 11/00 345/467 |
| 2013/0135511 A1* | 5/2013 | Yamada | H04N 5/232933 348/333.12 |
| 2017/0213569 A1* | 7/2017 | Jang | G10L 15/04 |
| 2018/0310071 A1* | 10/2018 | Panchaksharaiah | H04N 21/4858 |

* cited by examiner

FIG. 9

| | | |
|---|---|---|
| BEHAVIOR STATE AND MENTAL STATE OF USER | CONCENTRATION STATE | DEGREE OF CONCENTRATION OF LINE OF SIGHT TO TEXT |
| | | DEGREE OF CONCENTRATION TO APP |
| | | ... |
| | TENSE STATE | NUMBER OF BLINKS |
| | | HEART RATE |
| | | DEGREE OF DISTURBANCE OF BRAIN WAVE |
| | | DEGREE OF UNSTEADINESS OF LINE OF SIGHT |
| | | NUMBER OF BREATHS |
| | | ... |
| | OPERATION STATE | NUMBER OF OPERATIONS |
| | | ... |
| | SPEECH STATE | INTENSITY OF EMOTION (DEGREE OF EXCITATION) |
| | | AMOUNT OF WHOLE SPEECH |
| | | ... |
| | BUSYNESS STATE | SPEECH ENTRY SPEED |
| | | SPEECH PITCH |
| | | DEGREE OF MOVEMENT OF WHOLE BODY |
| | | DEGREE OF GESTURE |
| | | ... |

FIG. 10

| USER CONTEXT | UTILIZATION TIME OF VOICE ENTRY PER DAY |
| --- | --- |
| | UTILIZATION TIME OF APPLICATION PER DAY |
| | LEARNING LEVEL OF VOICE ENTRY |
| | ... |
| USER PROPERTY | AGE |
| | GENDER |
| | NATIVE LANGUAGE |
| | ... |

FIG. 11

| APP CONTEXT | SOUND VOLUME OF SOUND INFORMATION OUTPUT FROM APP |
| --- | --- |
| | NUMBER OF SIMULTANEOUS USERS OF APP |
| | DEGREE OF IMPORTANCE OF TEXT CORRECTION |
| | DEGREE OF CHANGE OF OTHER ITEMS THAN TEXT IN SCREEN |
| | DEGREE OF IMPORTANCE OF PRESENT SCENE |
| | WHETHER OR NOT VOICE OUTPUT IS USED IN PARALLEL |
| | TEXT DISPLAY POSITION |
| | ATTRIBUTE OF TEXT FIELD |
| | WHETHER OR NOT PREVIOUS TEXT IS AVAILABLE |
| | WHETHER OR NOT THERE IS DESTINATION OF TEXT |
| | ... |

FIG. 12

| | I | thought | Shinjuku | would | be | a | good | place | ... |
|---|---|---|---|---|---|---|---|---|---|
| NUMBER OF CHARACTERS | 1 | 7 | 8 | 5 | 2 | 1 | 4 | 5 | ... |
| TYPE OF TERMINOLOGY | 1 | 1 | 2 | 1 | 1 | 1 | 1 | 1 | ... |
| SPEECH SPEED | 3 | 3 | 3 | 3 | 3 | 3 | 3 | 3 | ... |
| SPEECH PITCH | 3 | 3 | 3 | 3 | 3 | 3 | 3 | 3 | ... |
| EMOTION (STATE OF EXCITATION) | 3 | 3 | 3 | 3 | 3 | 3 | 3 | 3 | ... |
| ... | ... | ... | ... | ... | ... | ... | ... | ... | ... |

FIG. 13

```
{
"totalScore" : 0.654,
"userStatus" : {
  "concentration" : {"forTextField": 0.6, "forTextApp": 0.6},
  "nervousness" : {"blinkRate": 1.0, "heartRate": 60, "brainState": "normal", "gazeState": "normal", "breathingRate": 15},
  "operationState" : ["arrowKey": 5, "buttonA": 6, "buttonB": 7, "buttonC": 4, "buttonD": 2, "stickA": 30},
  "speechProperty" : {"emotion" : {"joy": 0.4, "sadness": 0.1, "anger": 0.01, "fear": 0, "disgust": 0.1, "excitement": 0.4},
  "speech": {"time": "8sec", "amount": "normal"},
  "busyness": {"speech": {"speakingRate": 0.4, "pitchAverage": "400hz"}, "motion": {"body": "normal", "hand": "normal", "head": "normal"}}
},
"userContext": {
  "voiceInputUsage": {"totalTime": "366035sec", "today": "0sec"},
  "appUsage" : {"appName": "chat XYZ editor", "timeInfo" : {"totalTime": "456656sec", "today": "0sec"}},
  "proficiency": "normal"
},
"userProperty": {"age": 26, "sex": "male", "oftenUse" : "false", "langSetting": "en-US", "appLang": "en-US"},
"appContext": {
  "volume": {"ttsOut": 40, "appOut": 30, "maxOut": 90},
  "userInfo": {"multiNum": {"current": 2, "max": 8}},
  "textFieldInfo" : {"width": "430px", "height": "900px", "position": "center-right", "effect": "nothing", "visibility": "normal", "isExist": true},
  "textUsage": {"target": "forPersonal", "politeFlag": "false", "accurasyFlag": "false"},
  "screen": {"changeRate": "low"},
  "sceneState": {"current": "normal", "afterLittle": "normal", "littleWhileAgo": "normal"},
  "otherNotification": {"tts": false, "sound": "false"}
},
}
```

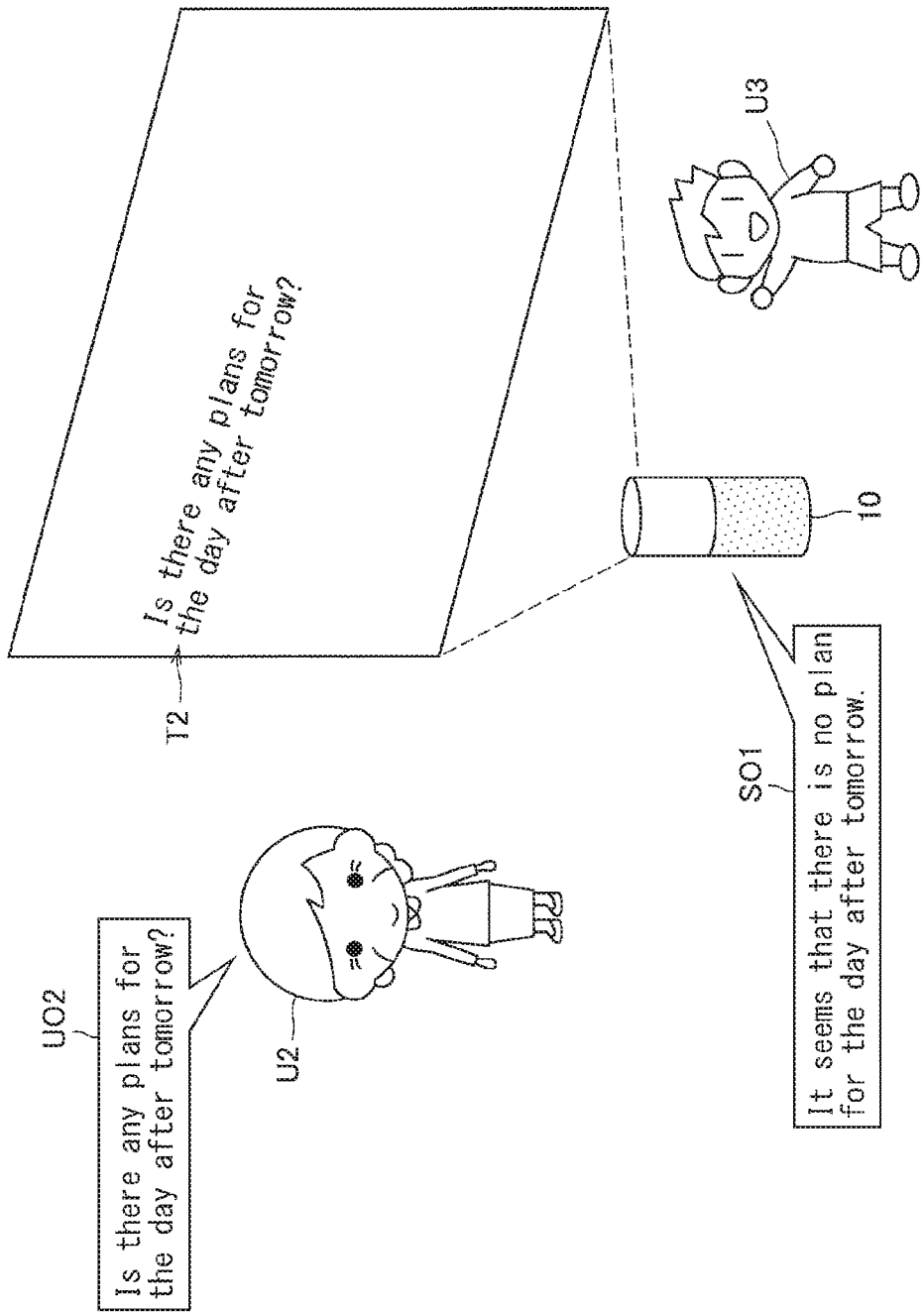

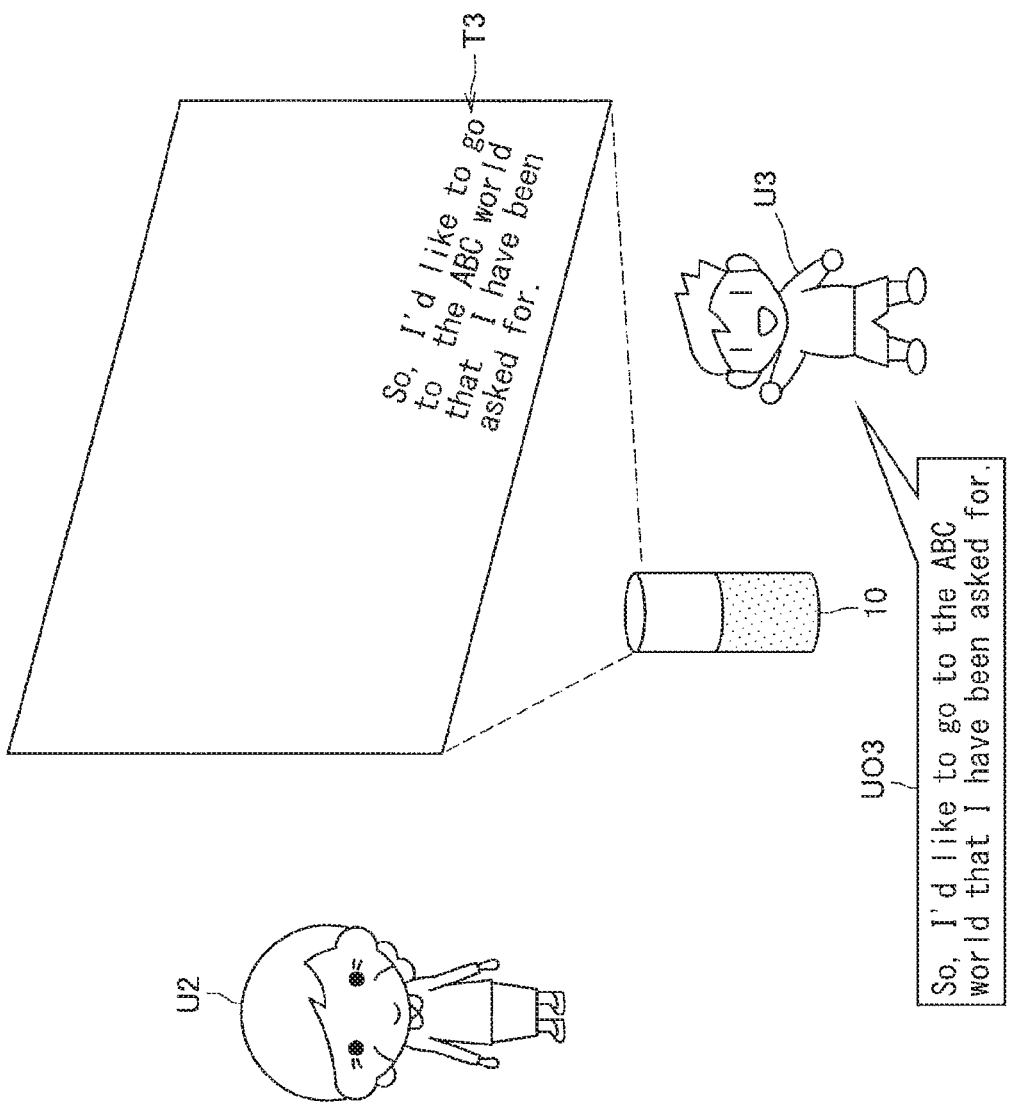

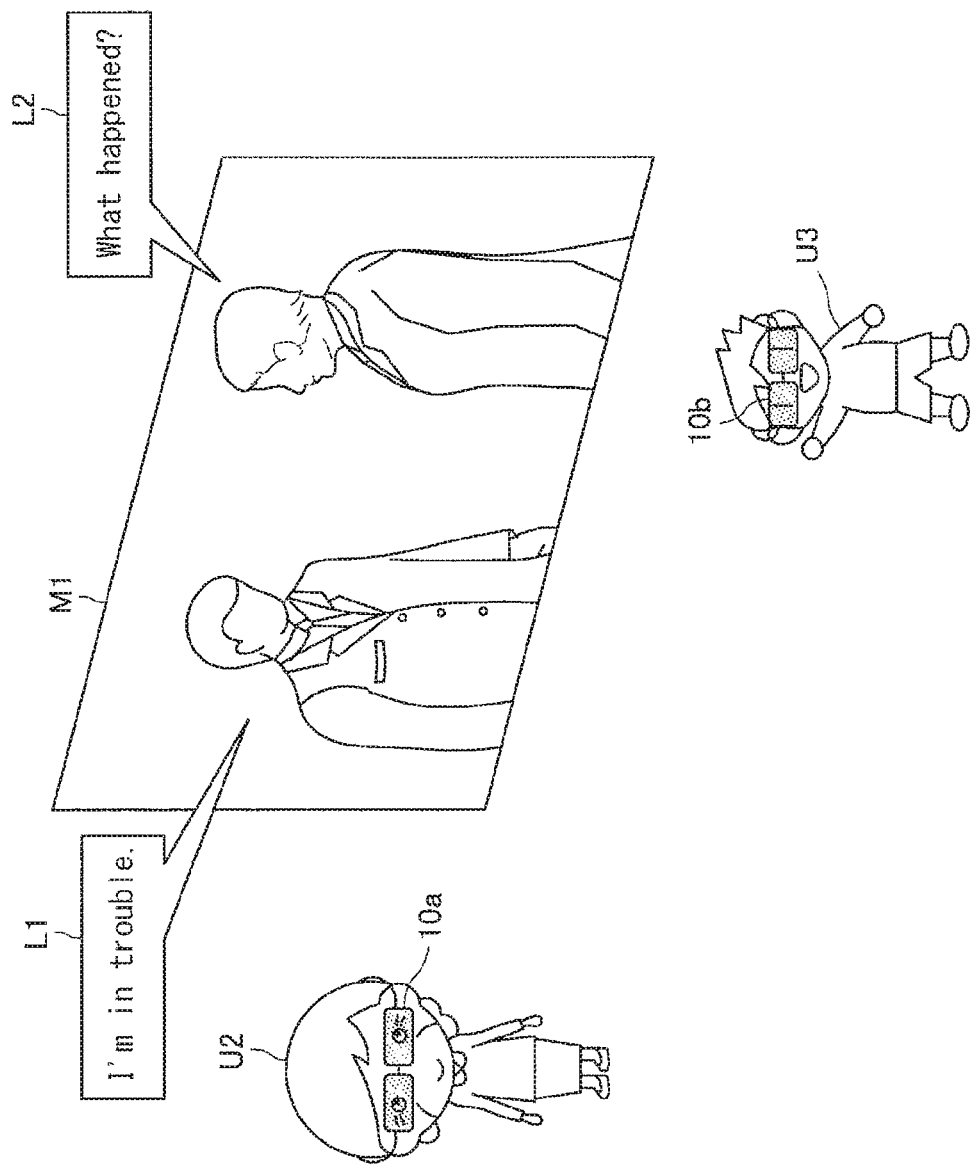

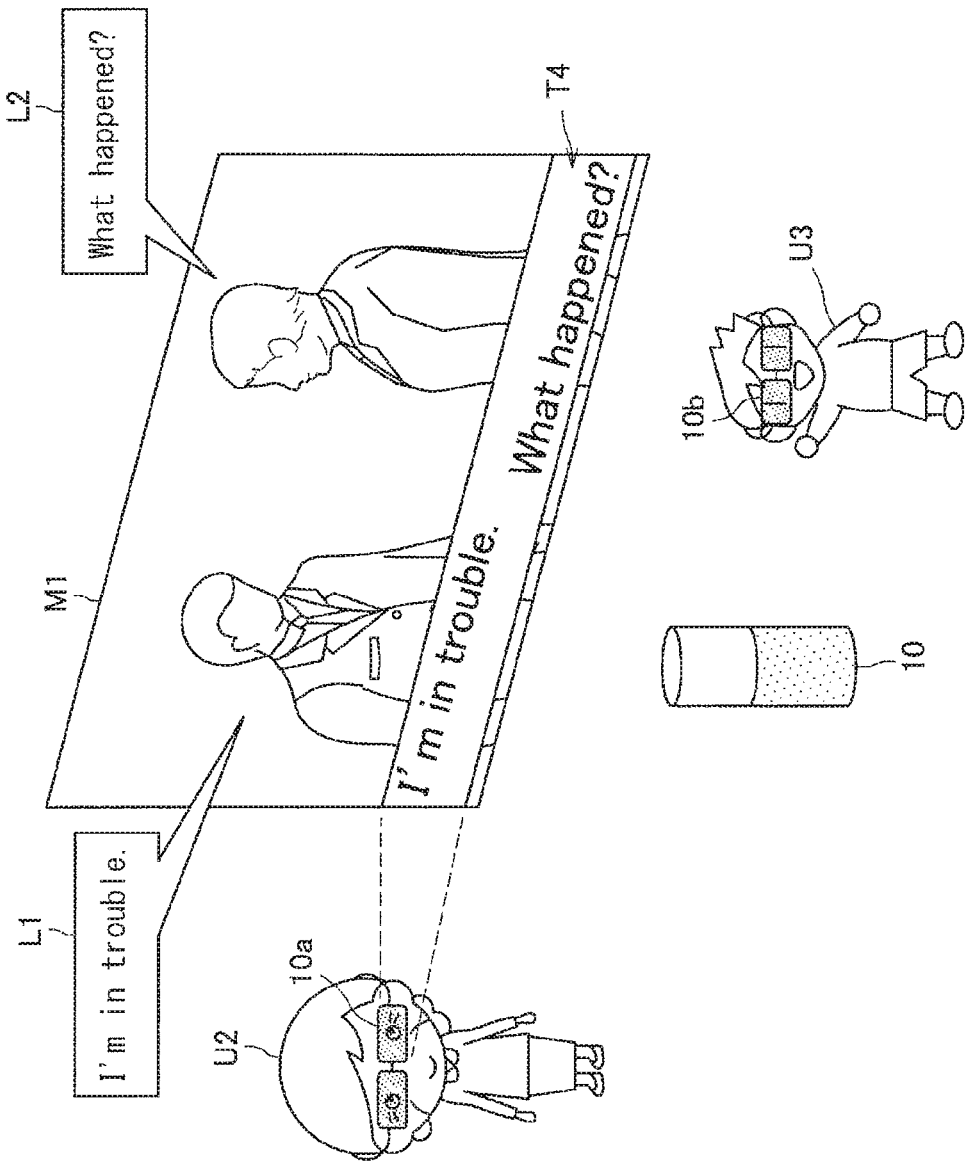

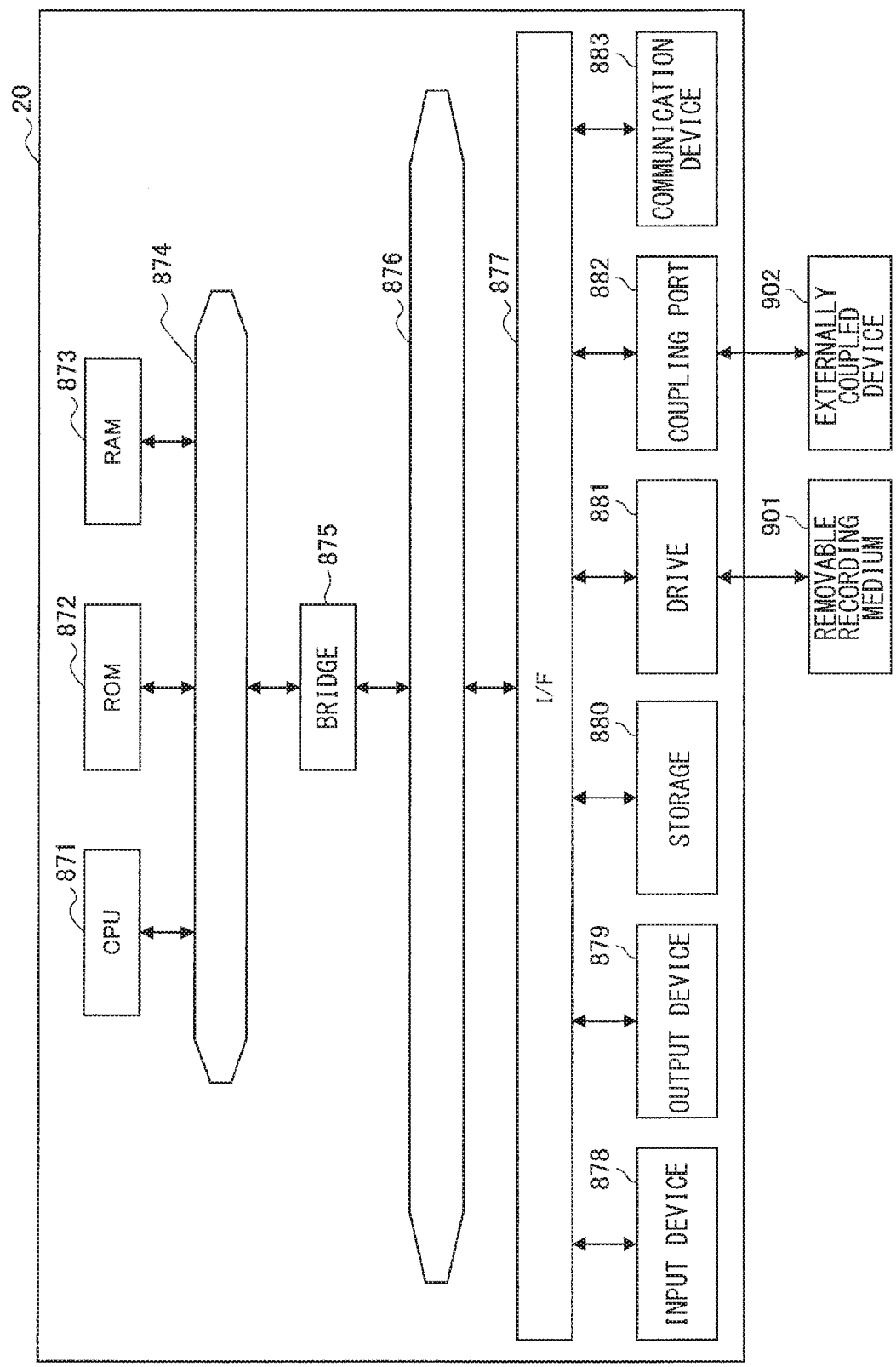

INFORMATION PROCESSING DEVICE USING RECOGNITION DIFFICULTY SCORE AND INFORMATION PROCESSING METHOD

CROSS-REFERENCE TO RELATED APPLICATIONS

The present application is based on PCT filing PCT/JP2018/001918, filed Jan. 23, 2018, which claims priority to JP 2017-085416, filed Apr. 24, 2017, the entire contents of each are incorporated herein by reference.

TECHNICAL FIELD

The present disclosure relates to an information processing device and an information processing method.

BACKGROUND ART

As advancement of information processing technologies, such various devices have been widely prevailing that present character information to users. Furthermore, such various technologies have been proposed that improve visibility of such character information as described above. For example, PTL 1 discloses a technology that divides character information into character groups per predetermined unit. The technology then performs presentation control of the character groups on the basis of set intervals.

CITATION LIST

Patent Literature

PTL 1: Japanese Unexamined Patent Application Publication No. 2009-13542

SUMMARY OF INVENTION

Problems to be Solved by the Invention

In the technology described in PTL 1, the character groups described above are set on the basis of structural features pertaining to character information such as clauses and words. It is assumed, however, that various factors in addition to the structural features as described above affect how a user recognizes character information. It is therefore difficult to say that, with the technology described in PTL 1, the presentation control will fully take place in accordance with a situation.

In view of the issue described above, the present disclosure proposes a novel and improved information processing device and a novel and improved information processing method, making it possible to achieve displaying of a text in a more flexible and highly readable manner in accordance with a situation.

Means of Solving the Problems

According to the present disclosure, an information processing device is provided. The information processing device includes a calculator that calculates, on the basis of context data to be entered, a recognition difficulty score used for display control of a target text.

According to the present disclosure, an information processing method is further provided. The information processing method includes allowing a processor to calculate, on the basis of context data to be entered, a recognition difficulty score used for display control of a target text.

Effects of the Invention

As described above, the present disclosure makes it possible to achieve displaying of a text in a more flexible and highly readable manner in accordance with a situation.

The effects described above are not to be necessarily construed as limiting. In addition to or instead of the effects described above, one or more effects described in the present specification or other effects that may be derived from the present specification may be achieved.

BRIEF DESCRIPTION OF DRAWINGS

FIG. 9 is a diagram that illustrates an example of a context management table pertaining to a user state, according to the embodiment.

FIG. 10 is a diagram that illustrates an example of a context management table pertaining to a user context and a user property, according to the embodiment.

FIG. 11 is a diagram that illustrates an example of a context management table pertaining to an application context, according to the embodiment.

FIG. 12 is a diagram that illustrates an example of a context management table pertaining to a character context, according to the embodiment.

FIG. 13 is an example of a format for a recognition difficulty score according to the embodiment.

FIG. 18A is a diagram that illustrates an example case where a technical concept according to the embodiment is applied to a voice agent.

FIG. 18B is a diagram that illustrates the example case where the technical concept according to the embodiment is applied to the voice agent.

FIG. 19A is a diagram that illustrates an example case where the technical concept according to the embodiment is applied to subtitle control.

FIG. 19B is a diagram that illustrates the example case where the technical concept according to the embodiment is applied to the subtitle control.

FIG. 20 is a diagram that illustrates a hardware configuration example according to an embodiment of the present disclosure.

MODES FOR CARRYING OUT THE INVENTION

Figure 1:
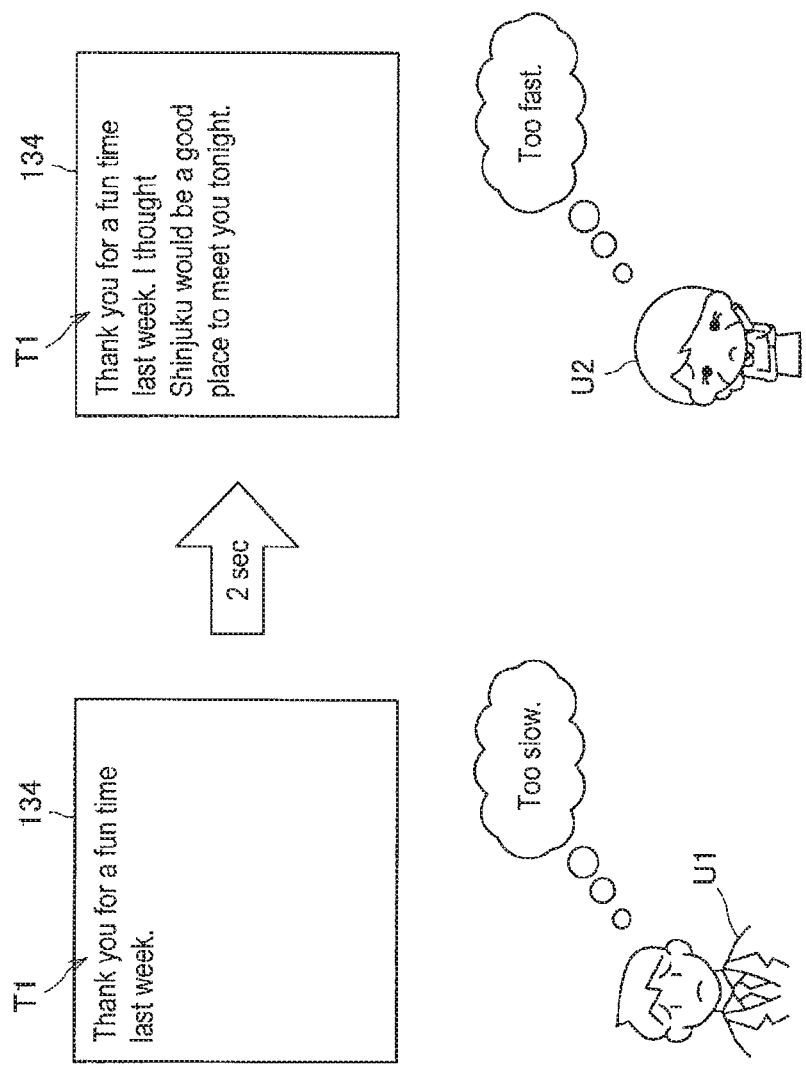
FIG. 1 is a diagram that is used to describe outline of an embodiment of the present disclosure.

Some preferable embodiments of the present disclosure will be described herein in detail with reference to the accompanying drawings. Note that, in the present specification and the drawings, like reference numerals designate components having substantially identical functional configurations to omit duplicated description.

It is to be noted that the description is made in the following order.
1. Embodiment
   1.1. Outline
   1.2. System Configuration Example
   1.3. Functional Configuration Example of Information Processing Terminal 10
   1.4. Functional Configuration Example of Information Processing Server 20
   1.5. Calculation of Recognition Difficulty Score
   1.6. Flow of Processing
   1.7. Application Examples
2. Hardware Configuration Example
3. Summary

1. Embodiment

[[1.1. Outline]]

Outline of an embodiment of the present disclosure will first be described herein. As described above, such various devices and applications have been recently prevailing that present text information to a user. Additionally, many technologies have been proposed that control units of display and display intervals pertaining to text presentation to improve ease of text recognition by a user.

It is assumed that, in a case where a text containing a large number of characters is displayed at a time, for example, a user has to spend time and effort to confirm and understand the content of the text. Furthermore, in a case where the content of a text is complicated, for example, as well as in a case where a user is simultaneously performing another operation, for example, it is concerned that the user is increasingly bothered because the user would have to repeatedly read the text, for example.

At this time, dividing the text into a plurality of units of display and displaying the plurality of units of display at appropriate intervals make it possible to improve visibility and readability per unit of display. For example, PTL 1 discloses the technology that allows a unit of display to be set on the basis of structural features of a text, as described above, to improve visibility and readability of the text.

In a case where a unit of display is set solely on the basis of structural features of a text, however, it is assumed that, depending on a situation, a user would not be able to fully recognize the text or the user would have to spend much time and effort to fully recognize the text.

Figure 2:
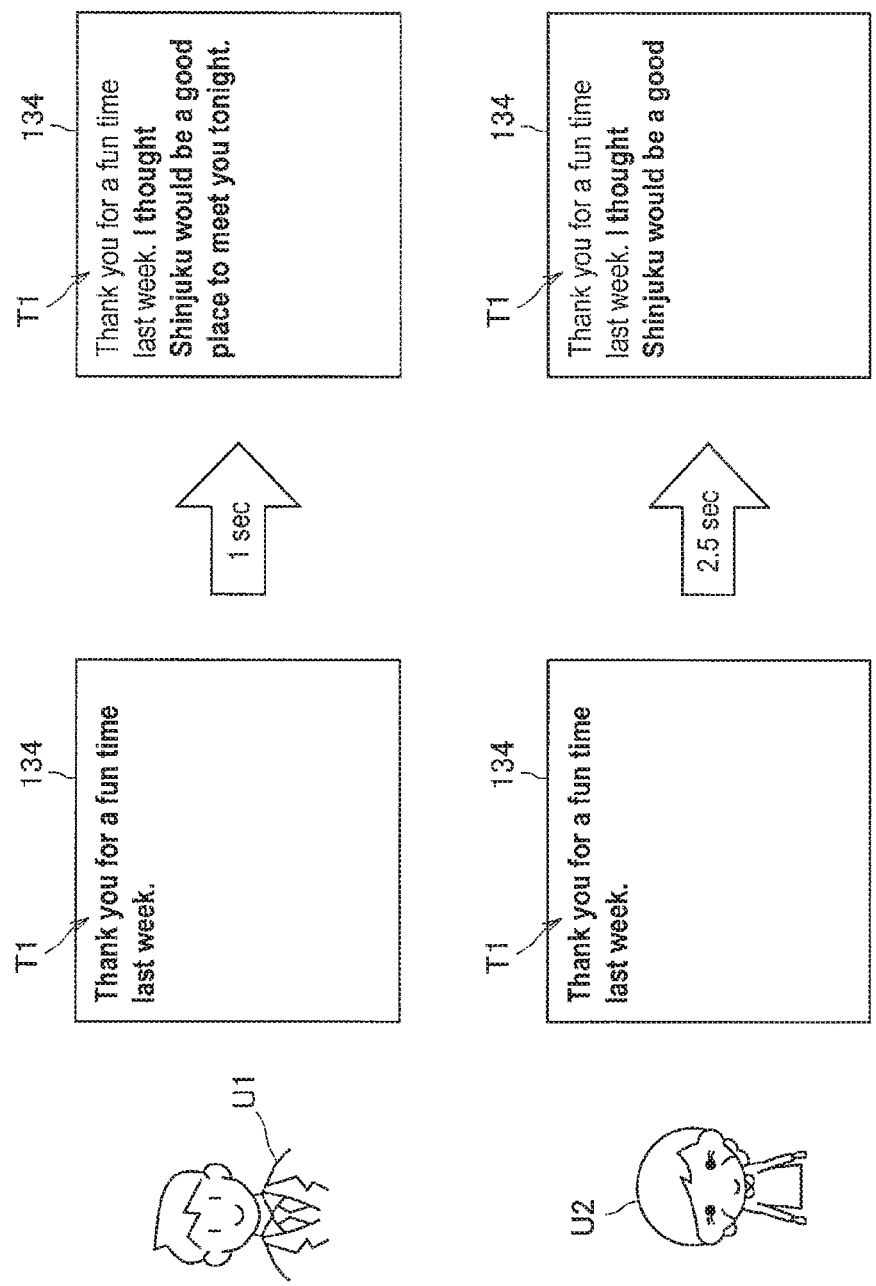
FIG. 2 is a diagram that is used to describe the outline of the embodiment.

FIGS. 1 and 2 are diagrams that are used to describe outline of an embodiment of the present disclosure. FIG. 1 illustrates text information T1 displayed on a display 134 and users U1 and U2. In the example case illustrated in FIG. 1, the text information T1 is divided into two units of display. The two divided units of display of the text information T1 are presented to the users U1 and U2 at an identical display interval.

In this case, it is assumed that the user U1 may feel that an amount of information pertaining to each of the units of display is too less and the display interval is too long. It is, however, assumed that the user U2 may feel that the amount of information pertaining to each of the units of display is too great and the display interval is too short. As described above, it is assumed that an appropriate unit of display and an appropriate display interval pertaining to the text recognition may change, as required, depending on factors such as a situation and characteristics of a user.

An information processing server 20 according to the embodiment of the present disclosure may therefore calculate, on the basis of various contexts pertaining to a user or an application, a recognition difficulty score used for display control of a target text, for example. Here, the recognition difficulty score described above is an index indicative of a degree of difficulty pertaining to recognition of a target text by a user. Furthermore, it is possible in an information processing terminal 10 according to the embodiment of the present disclosure to perform display control of a target text on the basis of such a recognition difficulty score as described above.

FIG. 2 illustrates a display example of a target text that undergoes the display control on the basis of a recognition difficulty score according to the present embodiment. In a case where, for example, the recognition difficulty score indicates that the user U1 is in a situation where the target text is easily recognizable, the information processing terminal 10 according to the present embodiment may control displaying of the target text, i.e., the text T1 by setting units of display each containing a relatively greater amount of information and relatively shorter display intervals, as illustrated in an upper section of FIG. 2. With the control described above by the information processing terminal 10, it is possible to display the text T1 per unit of display at display intervals in accordance with a situation of the user U1. As a result, it is possible to solve complaints of the user U1 claiming that the text display is too slow, for example.

Alternatively, in a case where, for example, the recognition difficulty score indicates a situation where the user U2 faces difficulty in recognizing a target text, the information processing terminal 10 according to the present embodiment may control displaying of the text T1 by setting units of display each containing a relatively smaller amount of information and relatively longer display intervals, as illustrated in a lower section of FIG. 2. With the control described above by the information processing terminal 10, it is possible to display the text T1 per unit of display at display intervals in accordance with a situation of the user U2. As a result, it is possible to solve complaints of the user U2 claiming that the text display is too fast to understand, for example.

Note that the example case is illustrated with reference to FIG. 2 where the information processing server 20 calculates the recognition difficulty scores pertaining to the users U1 and U2, and where the information processing terminal 10 performs the display control of the target text per user on the basis of each of the recognition difficulty scores described above. However, how a recognition difficulty score is calculated and how the display control of a target text is performed, according to the present embodiment, are not limited to the example.

It is assumed that, even for a single user, for example, various factors dynamically affect a recognition difficulty score. The information processing server 20 according to the present embodiment may therefore calculate, as required, a recognition difficulty score per single user. The information processing terminal 10 may therefore control, as required, displaying of a target text to the single user on the basis of the recognition difficulty score described above. With the information processing server 20 and the information processing terminal 10 according to the present embodiment, it is possible to appropriately control a unit of display, a display interval, and a display effect on the basis of various factors (contexts). It is also possible to present information highly visible and highly readable to a user.

[[1.2. System Configuration Example]]

Figure 3:
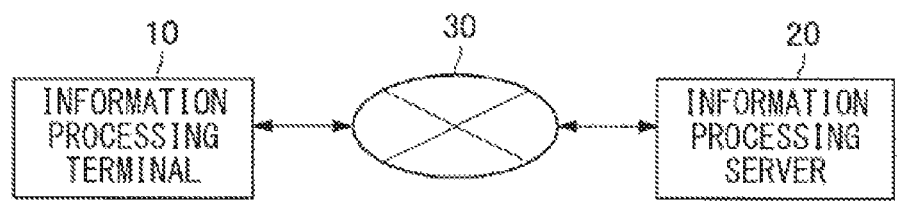
FIG. 3 is a diagram that illustrates an example of a system configuration according to the embodiment.

Next, a system configuration example according to the present embodiment will be described herein. FIG. 3 is a diagram that illustrates an example of a system configuration according to the present embodiment. As illustrated in FIG. 3, an information processing system according to the present embodiment includes the information processing terminal 10 and the information processing server 20. Furthermore, the information processing terminal 10 and the information processing server 20 are coupled with each other via a network 30 to achieve mutual communications.

[Information Processing Terminal 10]

The information processing terminal 10 according to the present embodiment is an information processing device that presents text information to a user on the basis of display control information received from the information processing server 20. Furthermore, the information processing terminal 10 according to the present embodiment has a function that collects various kinds of sensor information and application information and sends the collected information to the information processing server 20. The information processing terminal 10 according to the present embodiment may be a smartphone, a tablet, a personal computer (PC), a mobile phone, a wearable device, a gaming device, or an agent device of various kinds, for example. The information processing terminal 10 according to the present embodiment may further have a function that sends voice information collected from a user to the information processing server 20 and presents a recognized text to the user, for example.

[Information Processing Server 20]

The information processing server 20 according to the present embodiment is an information processing device that calculates, on the basis of context data, a recognition difficulty score used for display control of a target text. Here, the context data described above may be data indicative of various kinds of situations, states, and factors pertaining to displaying of a target text. The context data according to the present embodiment will be separately described later in detail. Furthermore, the information processing server 20 according to the present embodiment sends, to the information processing terminal 10, display control information used for display control of a target text.

Figure 4:
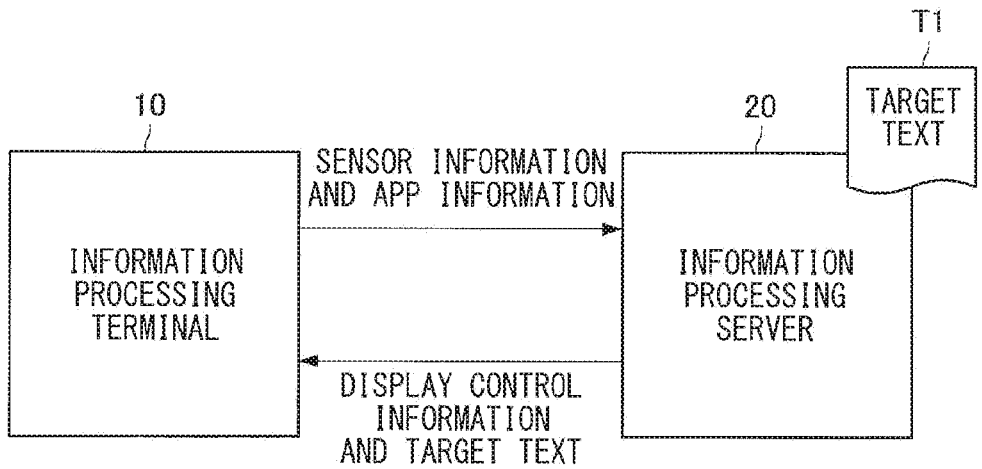
FIG. 4 is a conceptual diagram that is used to describe how data is input and output, according to the embodiment.

Outline of data to be sent and received between the information processing terminal 10 and the information processing server 20 will now be described. FIG. 4 is a conceptual diagram that is used to describe how data is input and output, according to the present embodiment. The information processing terminal 10 according to the present embodiment first sends collected sensor information and application information to the information processing server 20.

Next, the information processing server 20 calculates, on the basis of the sensor information and the application information described above, a recognition difficulty score used for display control of the target text T1. That is, the context data according to the present embodiment may contain the sensor information and the application information sent from the information processing terminal 10. The context data may further contain various kinds of data estimated on the basis of the sensor information and the application information. Furthermore, the target text T1 may be a text generated by the information processing server 20 on the basis of voice information sent from the information processing terminal 10.

Next, the information processing server 20 sends, to the information processing terminal 10, display control information used for display control of the target text T1. At this time, a pattern under which the information processing server 20 sends the display control information may be appropriately determined in accordance with a function possessed by the information processing terminal 10, which is a destination of the information.

In a case where, for example, the information processing terminal 10 has a function that sets a unit of display, a display interval, or a display effect, for example, pertaining to displaying of the target text T1, on the basis of a recognition difficulty score, the information processing server 20 according to the present embodiment may send the recognition difficulty score, as display control information, to the information processing terminal 10.

Furthermore, in a case where, for example, the information processing terminal 10 has a function that performs the display control of the target text T1 on the basis of an entered unit of display, an entered display interval, or an entered display effect, for example, the information processing server 20 according to the present embodiment may send a unit of display, a display interval, or a display effect, for example, determined on the basis of a recognition difficulty score, as display control information, to the information processing terminal 10.

Furthermore, in a case where, for example, the information processing terminal 10 only has a display function that displays the target text T1 on the basis of an entered display control signal, the information processing server 20 according to the present embodiment may send a display control signal used to display the target text T1 on the basis of a determined unit of display, a determined display interval, or a determined display effect, for example, as display control information, to the information processing terminal 10. The information processing server 20 may further send the target text T1 together with the display control information to the information processing terminal 10.

[Network 30]

The network 30 has a function that couples the information processing terminal 10 and the information processing server 20. For example, the network 30 may include public networks such as the Internet, telephone networks, and satellite communication networks, various kinds of local area networks (LANs) including Ethernet (registered trademark), and wide area networks (WANs). The network 30 may further include dedicated networks such as Internet Protocol-Virtual Private Network (IP-VPN). The network 30 may still further include wireless communication networks such as Wi-Fi (registered trademark) and Bluetooth (registered trademark).

The configuration example of the information processing system according to the present embodiment has been described above. Note that the configuration described above with reference to FIG. 2 is merely an example. The information processing system according to the present embodiment is not limited in configuration to the example. As described with reference to FIG. 4, for example, a function pertaining to the display control of a target text may be appropriately designed in accordance with specifications and implementations. Furthermore, it is possible to achieve the information processing terminal 10 and the information processing server 20 according to the present embodiment as a single device, for example. The functions possessed by the information processing terminal 10 and the information processing server 20 according to the present embodiment may otherwise be distributed over and achieved by a plurality of devices. The configuration of the information processing system according to the present embodiment may be flexibly modified.

[[1.3. Functional Configuration Example of Information Processing Terminal 10]]

Figure 5:
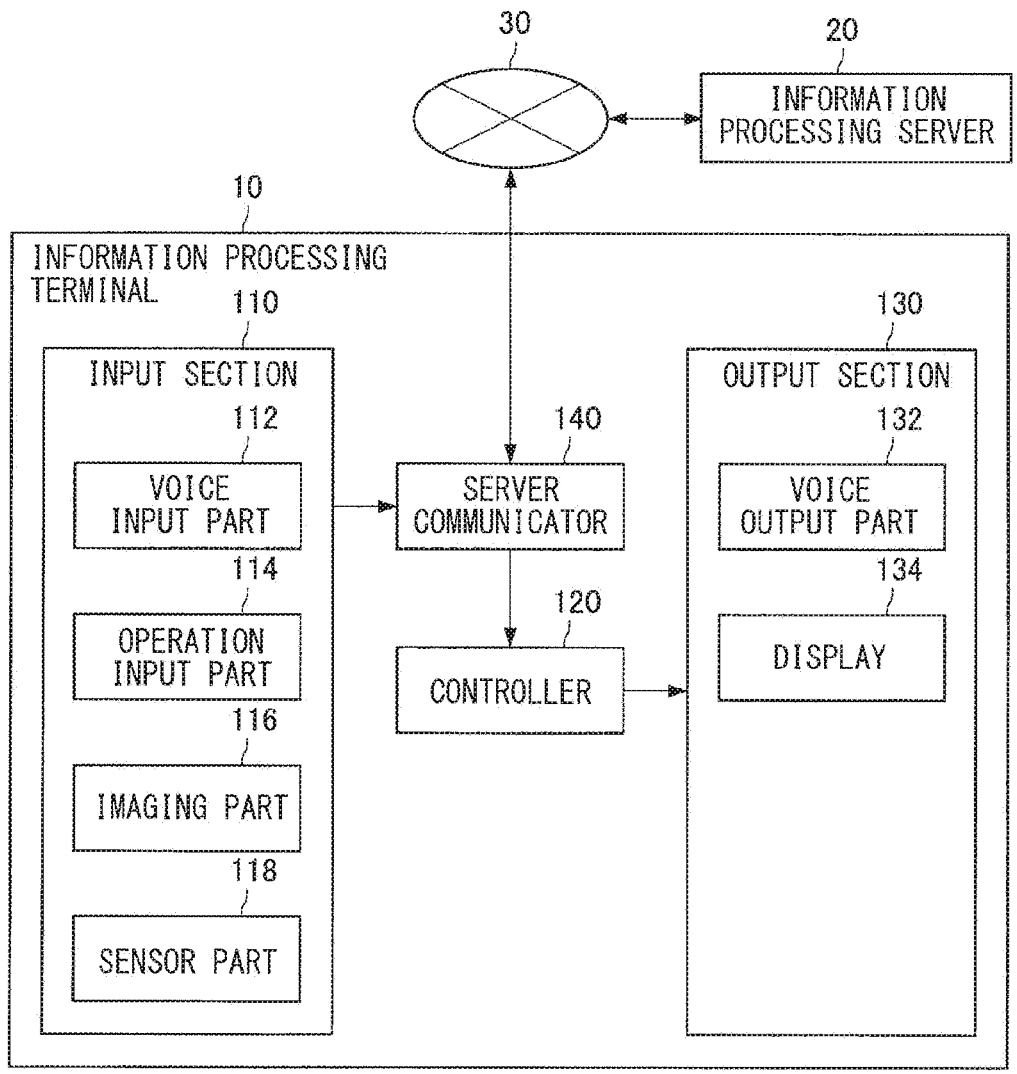
FIG. 5 is an example of a functional block diagram of an information processing terminal according to the embodiment.

Next, a functional configuration example of the information processing terminal 10 according to the present embodiment will be described herein. FIG. 5 is an example of a functional block diagram of the information processing terminal 10 according to the present embodiment. As illustrated in FIG. 5, the information processing terminal 10 according to the present embodiment includes an input section 110, a controller 120, an output section 130, and a server communicator 140.

[Input Section 110]

The input section 110 according to the present embodiment includes a voice input part 112, an operation input part 114, an imaging part 116, and a sensor part 118.

[[Voice Input Part 112]]

The voice input part 112 according to the present embodiment has a function that detects a speech of a user. Furthermore, the voice input part 112 may detect various kinds of sound information in addition to the speech described above. The voice input part 112 according to the present embodiment includes, for this purpose, a voice detection device such as a microphone. Note that, unless otherwise specified, the sensor information according to the present embodiment contains various kinds of sound information collected by the voice input part 112.

[[Operation Input Part 114]]

The operation input part 114 according to the present embodiment has a function that detects various kinds of operations entered by a user. It is possible in the operation input part 114 to detect text operations and application operations by a user, for example. The operation input part 114 according to the present embodiment includes, for this purpose, a mouse, a keyboard, a controller, a touch panel, and various buttons, for example.

[[Imaging Part 116]]

The imaging part 116 according to the present embodiment has a function that captures images of a user and surrounding scenery. The imaging part 116 according to the present embodiment includes, for this purpose, an imaging sensor and a lens, for example. Note that, unless otherwise specified, the sensor information according to the present embodiment contains image information collected by the imaging part 116.

[[Sensor Part 118]]

The sensor part 118 according to the present embodiment has a function that collects various kinds of information pertaining to a user. The sensor part 118 includes a temperature sensor, a humidity sensor, an optical sensor, an acceleration sensor, a gyro sensor, a geomagnetic sensor, and a biological sensor, for example. Note that the biological sensor described above is a pulse sensor, a myoelectric sensor, or a brain wave sensor, for example.

[Controller 120]

The controller 120 according to the present embodiment has a function that controls various applications. The controller 120 according to the present embodiment further has a function that performs the display control pertaining to a target text on the basis of display control information received from the information processing server 20. The controller 120 may determine a unit of display, a display interval, and a display effect, for example, on the basis of a received recognition difficulty score to control displaying of a target text, for example. Furthermore, the controller 120 may control displaying of a target text on the basis of a received unit of display, a received display interval, or a received display effect, for example. Furthermore, the controller 120 may deliver a received display control signal to the display 134.

[Output Section 130]

The output section 130 according to the present embodiment includes a voice output part 132 and the display 134.

[[Voice Output Part 132]]

The voice output part 132 according to the present embodiment has a function that presents sound information to a user. The voice output part 132 outputs audio in accordance with an application on the basis of control by the controller 120, for example. Furthermore, the voice output part 132 may output a synthesized voice that is synthesized by the information processing server 20. The voice output part 132 according to the present embodiment includes, for this purpose, an amplifier and a speaker, for example.

[[Display 134]]

The display 134 according to the present embodiment has a function that presents visual information to a user on the basis of control by the controller 120 and a display control signal received from the information processing server 20. The display 134 according to the present embodiment includes, for this purpose, a display device that presents visual information. The display device described above is, for example, a cathode ray tube (CRT) display device, a liquid crystal display (LCD) device, an organic light emitting diode (OLED) device, or a touch panel.

[Server Communicator 140]

The server communicator 140 according to the present embodiment has a function that performs communications pertaining to information processing with the information processing server 20 via the network 30. Specifically, the server communicator 140 sends, to the information processing server 20, sensor information collected by the input section 110 and application information acquired by the controller 120, for example. Furthermore, the server communicator 140 receives display control information from the information processing server 20. As described above, the display control information according to the present embodiment may contain a recognition difficulty score, information pertaining to a unit of display, a display interval, and a display effect determined on the basis of the recognition difficulty score, and a display control signal itself that pertains to a target text. Furthermore, the server communicator 140 may receive a target text from the information processing server 20.

The functional configuration example of the information processing terminal 10 according to the present embodiment has been described above. Note that the configuration described above with reference to FIG. 5 is merely an example. The information processing terminal 10 according to the present embodiment is not limited in functional configuration to the example. The information processing terminal 10 according to the present embodiment may further include a configuration other than the configuration described above. The information processing terminal 10 may include a storage that stores various kinds of information, for example. Furthermore, the information processing terminal 10 may have a voice recognition function that corresponds to a voice recognition function of the information processing server 20, for example. Furthermore, the functions possessed by the information processing terminal 10 described above may otherwise be distributed over and achieved by a plurality of devices. For example, the input section 110, the controller 120, and the output section 130 may be respectively achieved as functions of separate devices. The functional configuration of the information processing terminal 10 according to the present embodiment may be flexibly modified.

[[1.4. Functional Configuration Example of Information Processing Server 20]]

Figure 6:
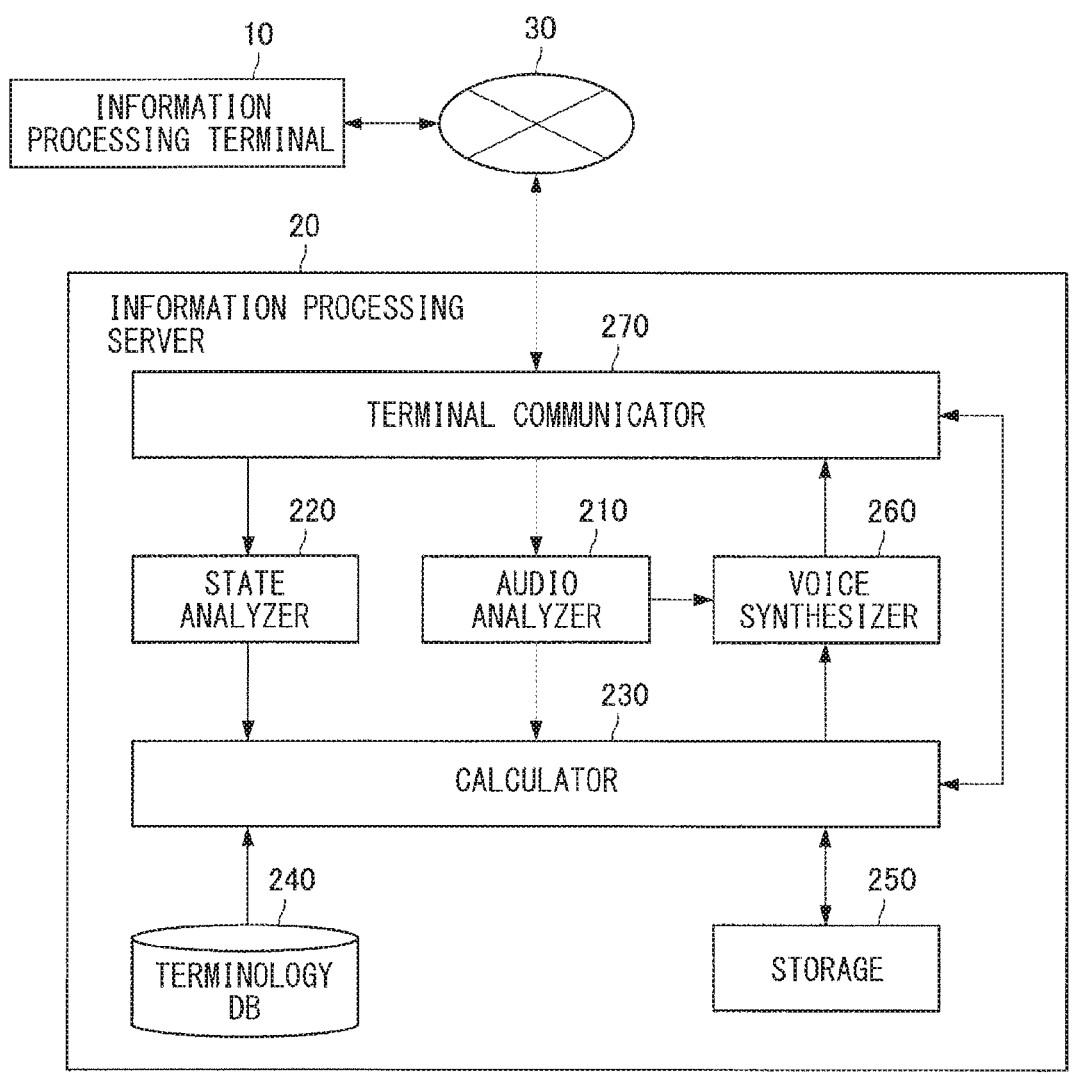
FIG. 6 is an example of a functional block diagram of an information processing server according to the embodiment.

Next, a functional configuration example of the information processing server 20 according to the present embodiment will be described herein. FIG. 6 is an example of a functional block diagram of the information processing server 20 according to the present embodiment. As illustrated in FIG. 6, the information processing server 20 according to the present embodiment includes an audio analyzer 210, a state analyzer 220, a calculator 230, a terminology database (DB) 240, a storage 250, a voice synthesizer 260, and a terminal communicator 270.

[Audio Analyzer 210]

The audio analyzer 210 according to the present embodiment has a function that performs various kinds of processing and analyses on the basis of sound information collected by the information processing terminal 10. For example, the audio analyzer 210 according to the present embodiment may perform signal processing, voice recognition, language discrimination, and natural language processing, for example, on the basis of a speech collected from a user to generate a target text. Furthermore, for example, the audio analyzer 210 according to the present embodiment may perform an analysis on the basis of a speech of a user to estimate an emotion of the user. Furthermore, it is possible in the audio analyzer 210 to measure an ambient noise level on the basis of collected sound information. Note that information processed or analyzed by the audio analyzer 210 according to the present embodiment may be used by the calculator 230 for calculation of a recognition difficulty score, which is described later.

[State Analyzer 220]

The state analyzer 220 according to the present embodiment has a function that performs various analyses pertaining to a state of a user, on the basis of image information and sensor information, for example, collected by the information processing terminal 10. For example, the state analyzer 220 according to the present embodiment may recognize user's line of sight, blinking, states of pupils and eyeballs, mouth opening degree, facial expression, and actions including gestures, for example, on the basis of the collected image information and the collected sensor information. Furthermore, the state analyzer 220 according to the present embodiment may analyze heartbeat, breathing, sweating, and states of tension and excitation, for example, on the basis of the collected sensor information. Information analyzed by the state analyzer 220 according to the present embodiment may be used by the calculator 230 for calculation of a recognition difficulty score.

[Calculator 230]

The calculator 230 according to the present embodiment has a function that calculates, on the basis of context data entered, a recognition difficulty score used for display control of a target text. As described above, the context data according to the present embodiment contains sensor information and application information collected by the information processing terminal 10. The context data further contains various kinds of information analyzed by the audio analyzer 210 and the state analyzer 220. The context data according to the present embodiment further contains user information stored in the storage 250, features of words contained in a target text, and structural features of the target text, for example. The functions possessed by the calculator 230 according to the present embodiment will be separately described in detail later.

[Terminology DB 240]

The terminology DB 240 according to the present embodiment is a database that stores data pertaining to various kinds of terminology. The DB 240 according to the present embodiment stores data pertaining to new words, abbreviated words, unique nouns, technical words, and trend words, for example. The information stored in the terminology DB 240 according to the present embodiment, as described above, is used to extract features of words contained in a target text when a recognition difficulty score is calculated by the calculator 230.

[Storage 250]

The storage 250 according to the present embodiment has a function that stores results of processing, for example, performed by the components provided in the information processing server 20. The storage 250 according to the present embodiment may, in particular, store a context management table corresponding to a recognition difficulty score calculated by the calculator 230. The storage 250 may further store image information of a user, for example. A situation of the image is to be used by the state analyzer 220 to recognize the user, for example.

[Voice Synthesizer 260]

The voice synthesizer 260 has a function that generates an artificial voice on the basis of a content of a target text or a notification. The artificial voice generated by the voice synthesizer 260 is sent, via the terminal communicator 270 and the network 30, to the information processing terminal 10. The artificial voice is then voice-output by the voice output part 132.

[Terminal Communicator 270]

The terminal communicator 270 according to the present embodiment has a function that performs information communications with the information processing terminal 10 via the network 30. Specifically, the terminal communicator 270 receives sensor information and application information from the information processing terminal 10. The terminal communicator 270 further has a function that sends display control information used for display control of a target text. As described above, the display control information according to the present embodiment may contain a recognition difficulty score, information pertaining to a unit of display, a display interval, and a display effect determined on the basis of the recognition difficulty score, and a display control signal itself that pertains to a target text. Furthermore, the terminal communicator 270 may send the target text to the information processing terminal 10.

The functional configuration example of the information processing server 20 according to the present embodiment has been described above. Note that the configuration described above with reference to FIG. 6 is merely an example. The information processing server 20 according to the present embodiment is not limited in functional configuration to the example. The information processing server 20 according to the present embodiment may further include other components than the components described above. The information processing server 20 may further include a component that controls an application, for example. The functions possessed by the information processing server 20 may otherwise be distributed over and achieved by a plurality of devices. The functional configuration of the information processing server 20 according to the present embodiment may be flexibly modified.

[[1.5. Calculation of Recognition Difficulty Score]]

Figure 7:
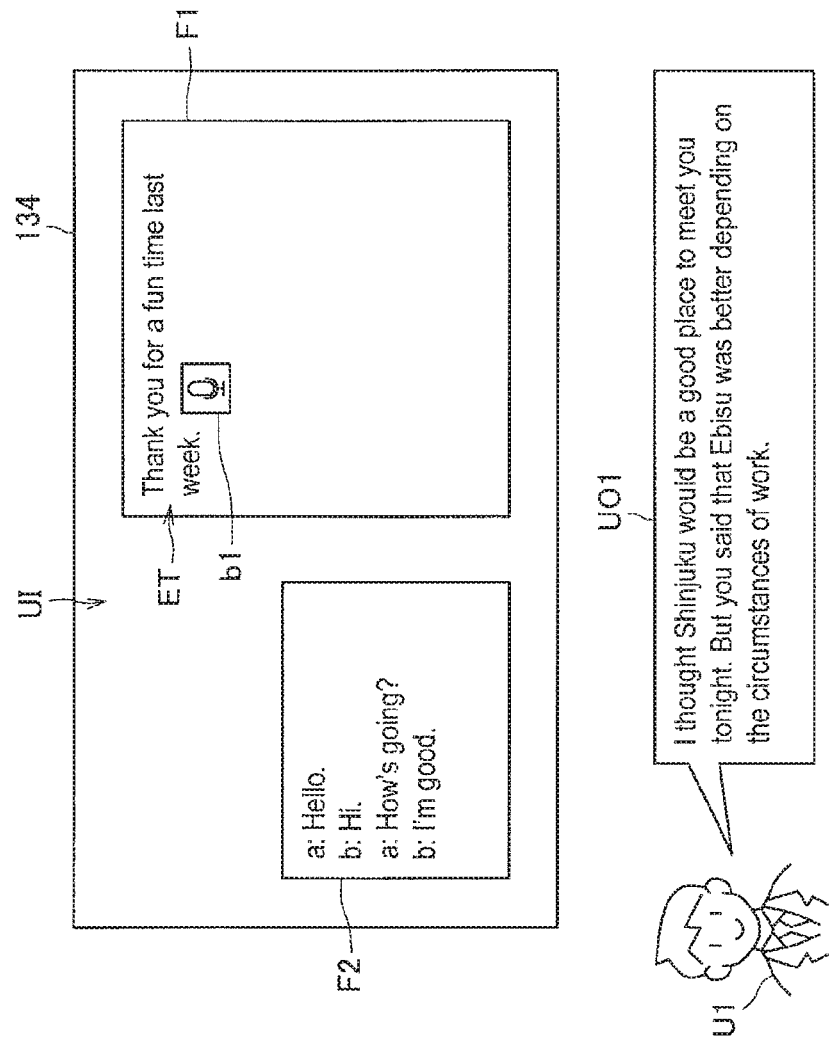
FIG. 7 is a diagram that illustrates an example of a user interface of an application according to the embodiment.

Next, how the calculator 230 according to the present embodiment calculates a recognition difficulty score will be described with reference to specific examples. FIG. 7 is a diagram that illustrates an example of a user interface of an application according to the present embodiment. Here, the application described above may be a messaging application or a gaming application having a voice recognition function, for example. FIG. 7 illustrates a user interface U1 of the application. The user interface U1 is displayed on the display 134 of the information processing terminal 10.

The user interface U1 has fields F1 and F2. The field F1 displays a target text generated by the information processing server 20 on the basis of a recognized speech of a user. The field F2 displays history of past messages. In the example illustrated in FIG. 7, the field F1 further displays a previous text ET recognized on the basis of a previous speech and a button b1 that controls start of voice recognition.

In this case, after the user U1 gives a speech UO1, as illustrated in FIG. 7, the information processing terminal 10 sends, to the information processing server 20, sound information pertaining to the collected speech UO1 of the user, other sensor information, and application information.

Next, the information processing server 20 performs voice recognition on the basis of the received speech UO1 of the user to generate a target text. The information processing server 20 further performs an analysis on the basis of the received sensor information. Next, the calculator 230 of the information processing server 20 executes a calculation of a recognition difficulty score on the basis of context data.

Figure 8:
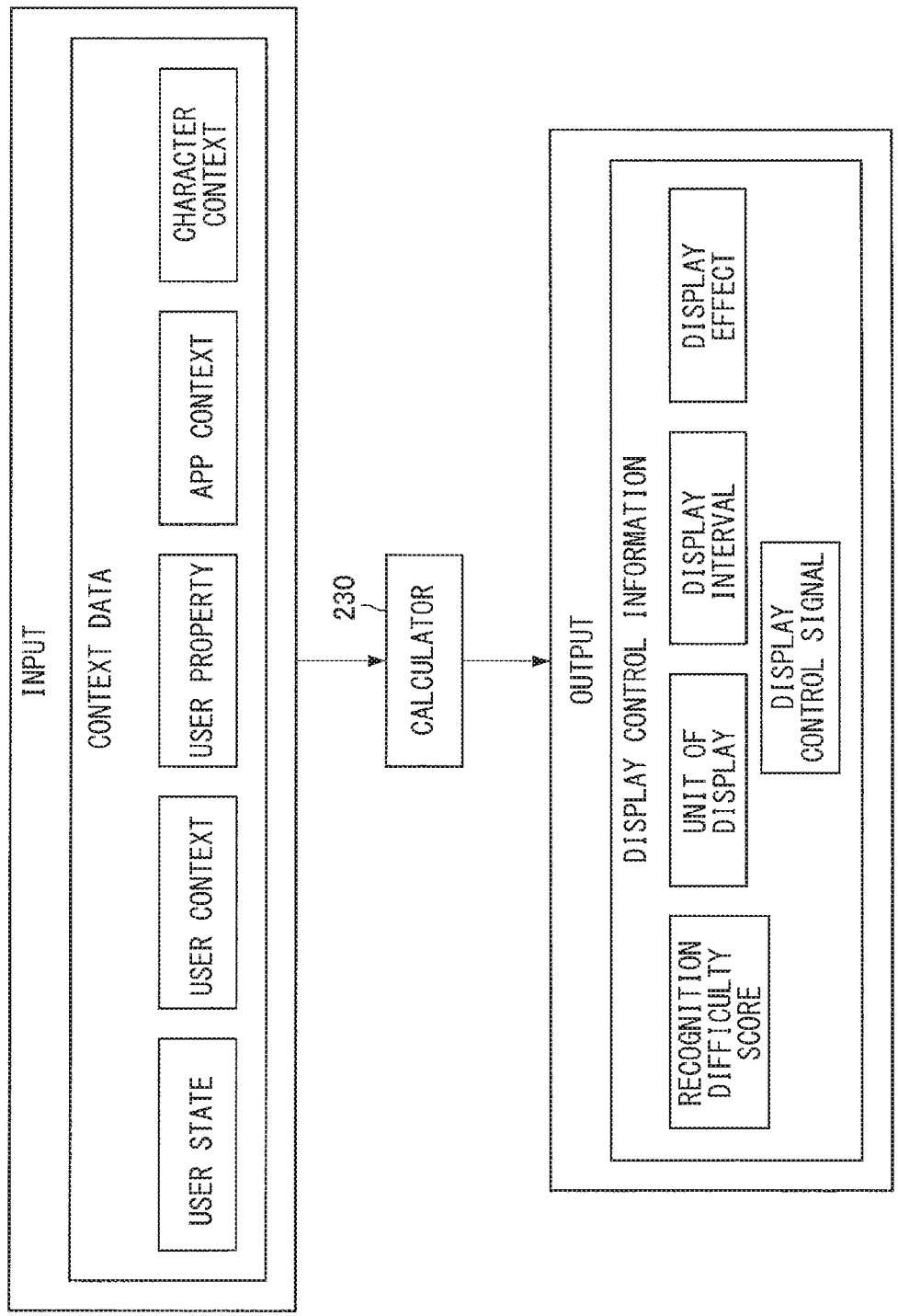
FIG. 8 is a diagram that is used to describe a relationship between input data and output data pertaining to a calculator according to the embodiment.

FIG. 8 is a diagram that is used to describe a relationship between input data and output data pertaining to the calculator 230 according to the present embodiment. As illustrated in FIG. 8, the calculator 230 receives context data. As described above, an entity of the context data according to the present embodiment contains sensor information, application information, and user information collected by the information processing terminal 10, and various kinds of information analyzed on the basis of the sensor information, the application information, and the user information.

In this case, the user context according to the present embodiment is largely divided into information pertaining to user state, information pertaining to user context, information pertaining to user property, information pertaining to application context, and information pertaining to character context.

Here, the user state described above may contain a behavior state and a mental state of a user. That is, it is possible in the calculator 230 according to the present embodiment to calculate a recognition difficulty score on the basis of context data pertaining to a behavior state and a mental state of a user. It is regarded as well that the user state according to the present embodiment represents user's characteristics that may change within a relatively short period of time. With the above-described function possessed by the calculator 230 according to the present embodiment, it is possible to control displaying of a target text on the basis of a unit of display, a display interval, and a display effect in accordance with user's characteristics that may change within a short period of time.

Furthermore, the user context described above may contain a tendency and experiences of a user, for example. That is, it is possible in the calculator 230 according to the present embodiment to calculate a recognition difficulty score on the basis of context data pertaining to a tendency and experiences of a user, for example. It is regarded as well that the user context according to the present embodiment represents user's characteristics that may change within a middle or long period of time. With the above-described function possessed by the calculator 230 according to the present embodiment, it is possible to control displaying of a target text on the basis of a unit of display, a display interval, and a display effect in accordance with user's characteristics that may change within a middle or long period of time.

Furthermore, the user property described above may contain an attribute and a type of a user, for example. That is, it is possible in the calculator 230 according to the present embodiment to calculate a recognition difficulty score on the basis of context data pertaining to an attribute and a type of a user, for example. It is regarded as well that the user property according to the present embodiment represents user's characteristics that would be less likely to change within a long period of time. With the above-described function possessed by the calculator 230 according to the present embodiment, it is possible to control displaying of a target text on the basis of a unit of display, a display interval, and a display effect in accordance with user's characteristics that would be less likely to change within a long period of time.

Furthermore, the application context described above may contain a state of an application that displays a target text, as well as other applications. That is, it is possible in the calculator 230 according to the present embodiment to control displaying of a target text on the basis of context data pertaining to states of various applications.

Furthermore, the character context described above may contain features of words contained in a target text and structural features of the target text. That is, it is possible in the calculator 230 according to the present embodiment to control displaying of a target text on the basis of context data pertaining to features of the target text.

As described above, it is possible in the calculator 230 according to the present embodiment to calculate a recognition difficulty score on the basis of context data containing various kinds of information. Furthermore, the calculator 230 according to the present embodiment may determine, as illustrated in FIG. 8, a unit of display, a display interval, and a display effect, for example, pertaining to a target text on the basis of the calculated recognition difficulty score. Moreover, the calculator 230 may generate a display control signal used to display the target text T1, on the basis of the determined unit of display, the determined display interval, and the determined display effect, for example. That is, it is possible in the calculator 230 according to the present embodiment to generate display control information in accordance with features of the information processing terminal 10 and to send the display control information to the terminal communicator 270.

Next, how the calculator 230 according to the present embodiment calculates a recognition difficulty score will be described in more detail. As described above, it is possible in the calculator 230 according to the present embodiment to calculate a recognition difficulty score on the basis of context data pertaining to various kinds of information. At this time, the calculator 230 according to the present embodiment may update the context management table stored in the storage 250 on the basis of the context data and calculate a recognition difficulty score on the basis of updated parameters.

FIG. 9 is a diagram that illustrates an example of a context management table pertaining to a user state, according to the present embodiment. In the example case illustrated in FIG. 9, the context management table pertaining to the user state contains items pertaining to concentration state, tense state, operation state, speech state, and busyness state.

Here, the concentration state described above may be set with further detailed sub-items pertaining to degree of concentration to text to be displayed and degrees of concentration to application that displays the text, for example. It is possible in the calculator 230 to update parameters pertaining to the concentration state on the basis of information including user's line of sight, pupils, eyeballs, and state of mouth opening degree, for example, contained in context data, for example. With the above-described function possessed by the calculator 230, it is possible to perform such control that increase an amount of information in a unit of display and shorten a display interval, for example, while a user is concentrating on a text or an application.

Furthermore, the tense state described above may be set with further detailed sub-items pertaining to the number of blinks, heart rate, degree of disturbance of brain wave, degree of unsteadiness of line of sight, or number of breaths, for example. It is possible in the calculator 230 to update parameters pertaining to the tense state on the basis of context data analyzed by the state analyzer 220. With the above-described function possessed by the calculator 230, it is possible to perform such control that, while a user is in an excessive tense situation, for example, an amount of information in a unit of display is reduced and a longer display interval is set, for example.

Furthermore, the operation state described above may be set with a further detailed sub-item pertaining to number of operations entered by a user on an application within a predetermined time, for example. It is possible in the calculator 230 to update parameters pertaining to the operation state on the basis of application information sent from the information processing terminal 10. With the above-described function possessed by the calculator 230, it is possible to perform such control that, while a user is performing many operations on an application, for example, an amount of information in a unit of display is reduced and a longer display interval is set, for example. The control described above is particularly effective in a case where a user has to check texts while playing a game on a gaming application having a text display function, for example.

Furthermore, the speech state described above may further be set with sub-items pertaining to intensity of emotion such as degree of excitation and amount of whole speech, for example. It is possible in the calculator 230 to update parameters pertaining to the speech state on the basis of context data analyzed by the audio analyzer 210. With the above-described function possessed by the calculator 230, it is possible to shorten a display interval while a user is excited, for example, to avoid such a situation from occurring that the user feels uncomfortable with slow display.

Furthermore, the busyness state described above may further be set with sub-items pertaining to speech entry speed, speech pitch, degree of movement of whole body, and degree of gesture, for example. It is possible in the calculator 230 to update parameters pertaining to the busyness state on the basis of context data analyzed by the audio analyzer 210 and the state analyzer 220. With the above-described function possessed by the calculator 230, it is possible to perform such control that a display interval is shortened when a user is in a hurry and a longer display interval is set when a user is performing an exercise, for example.

FIG. 10 is a diagram that illustrates an example of a context management table pertaining to a user context and a user property, according to the present embodiment. In the example case illustrated in FIG. 10, the context management table pertaining to the user context contains items pertaining to voice entries and utilization time of application per day, and learning level of voice entry, for example. It is possible in the calculator 230 to update such parameters as described above on the basis of application information received from the information processing terminal 10. With the above-described function possessed by the calculator 230, it is possible to perform such control that a longer display interval is set by taking into account user's fatigue in a case where there are many voice entries or an application is utilized for a long period of time in a day, or a shorter display interval is set for a user at a higher learning level, for example.

Furthermore, in the example case illustrated in FIG. 10, the context management table pertaining to the user property contains items pertaining to age, gender, and native language, for example. The calculator 230 may add, as required, such items as described above on the basis of information entered by a user on an application, for example. With the above-described function possessed by the calculator 230, it is possible to perform such control that a longer display interval is set for an elder person or a user whose native language differs from the language set on the application, for example.

FIG. 11 is a diagram that illustrates an example of a context management table pertaining to an application context, according to the present embodiment. In the example case illustrated in FIG. 11, the context management table pertaining to the application context contains items pertaining to sound volume of sound information output from application, number of simultaneous users of application, degree of importance of text correction, degree of change of other fields than text field in screen, degree of importance of present scene on application, whether or not voice output is used in parallel, position at which text is displayed, attribute of text field such as sizes of horizontal width and vertical width, whether or not previous text is available, and attribute of destination of text, for example. It is possible in the calculator 230 to update such parameters as described above on the basis of application information received from the information processing terminal 10, for example.

For example, there is a case where an application outputs loud background music and loud sound effect. There is another case where there are many simultaneous users.

There is still another case where a present scene is important on an application, such as when a user is confronting with a tough opponent on a gaming application. There is still another case where such a video is output that changes many times in a screen. Even in such cases, the above-described function possessed by the calculator 230 makes it possible to perform such control that a unit of display containing a smaller amount of information and a longer display interval are set under assumption that a user is distracted by other events than a text, for example.

Furthermore, for example, there is a case where accuracy is important when a voice recognition application recognizes a text. There is another case where a destination of a text is an important person such as a manager or a customer. Even in such cases, it is possible to perform such control that a unit of display containing a smaller amount of information and a longer display interval are set under assumption that a user may confirm a text more carefully, for example.

Furthermore, with the calculator 230 according to the present embodiment, it is possible to set a unit of display, a display interval, and a display effect by taking into account a position at which a text is displayed, and a size and a color scheme of the text, for example.

FIG. 12 is a diagram that illustrates an example of a context management table pertaining to a character context, according to the present embodiment. FIG. 12 illustrates an example case where the calculator 230 updates parameters per word contained in a target text. The parameters described above include, as an example, number of characters, type of terminology, speech speed, speech pitch, and emotion such as state of excitation.

With the above-described function possessed by the calculator 230, it is possible to perform such control that a unit of display is set on the basis of a combination of words in accordance with a number of characters, for example. The calculator 230 may set a unit of display with a maximum number of characters easily perceivable at once by a human. In a case where a target text is written in Japanese, for example, it is possible in the calculator 230 to combine words to allow a unit of display to contain approximately 13 characters. Furthermore, in a case of a greater total number of characters, the calculator 230 may set a display interval shorter as displaying of a text advances toward an end.

Furthermore, with the calculator 230 according to the present embodiment, it is possible to set a unit of display, a display interval, and a display effect in accordance with types of terminology contained in a target text, for example. The types of terminology described above include, for example, new words, abbreviated words, unique nouns, technical words, trend words, and foreign languages. In a case where, for example, a target text contains a new word or a word or an expression in a foreign language that is unfamiliar to a user (such as Bonjour), the calculator 230 may set a unit of display containing a smaller amount of information and a longer display interval. In a case where a user had used or entered an abbreviated word, a unique noun, a technical word, or a trend word contained in a target text, for example, the calculator 230 may set a unit of display and a display interval by taking into account a determination that the word or noun is highly readable by the user.

Furthermore, with the calculator 230 according to the present embodiment, it is also possible to set a unit of display and a display interval on the basis of a speech speed, a speech pitch, and an emotion per word contained in a target text, for example. It is possible in the calculator 230 to update the parameters described above on the basis of context data analyzed by the audio analyzer 210.

How the calculator 230 according to the present embodiment calculates a recognition difficulty score has been described above in detail. As described above, it is possible in the calculator 230 according to the present embodiment to update parameters in a context management table on the basis of context data pertaining to various kinds of information. Furthermore, the calculator 230 according to the present embodiment may use the updated parameters in the context management table to calculate a comprehensive recognition difficulty score and a recognition difficulty score per element. Furthermore, the calculator 230 may process the calculated recognition difficulty score in accordance with a format appropriate for communications with the information processing terminal 10.

FIG. 13 is an example of a format for a recognition difficulty score according to the present embodiment. In the example case illustrated in FIG. 13, the calculator 230 processes a calculated recognition difficulty score in accordance with a Javascript (registered trademark) Object Notation (JSON) format. As illustrated in FIG. 13, the format contains information of a comprehensive recognition difficulty score and recognition difficulty scores per element. Allowing the calculator 230 to process a recognition difficulty score, as illustrated in FIG. 13, makes it possible to send the recognition difficulty score in a format common to a plurality of the information processing terminals 10.

Furthermore, after receiving data in the format described above, the information processing terminal 10 may appropriately adopt a recognition difficulty score to be utilized in accordance with an application. For example, the information processing terminal 10 may use a comprehensive score contained in the format to set a unit of display and a display interval. Furthermore, in a case where the format contains a score of a user state, it is possible in the information processing terminal 10 to use only the score to set a unit of display and a display interval, for example.

Furthermore, the terminal communicator 270 of the information processing server 20 may send information pertaining to the unit of display and the display interval, for example, set by the calculator 230, to the information processing terminal 10, together with the recognition difficulty score processed in accordance with the format described above. In this case, it is possible in the information processing terminal 10 to perform such display control that a display effect is set in accordance with the received information, i.e., is set on the basis of a recognition difficulty score, for example. Note that FIG. 13 illustrates the example case where the calculator 230 processes a recognition difficulty score in accordance with the JSON format. However, the calculator 230 according to the present embodiment may process a recognition difficulty score in accordance with eXtensible Markup Language (XML), another general-purpose format or a unique format, for example.

Figure 14:
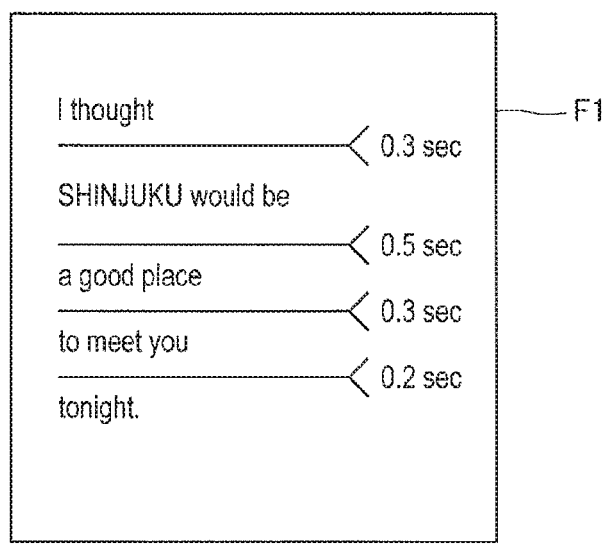
FIG. 14 is diagram that illustrates an example of a unit of display, display intervals, and display effects being set on the basis of a recognition difficulty score, according to the embodiment.

Next, how a unit of display, a display interval, and a display effect are set on the basis of a recognition difficulty score according to the present embodiment, as described above, will be described herein with reference to specific examples. FIG. 14 is a diagram that illustrates an example of a unit of display, display intervals, and display effects being set on the basis of a recognition difficulty score. In the example case illustrated in FIG. 14, the calculator 230 and the controller 120 of the information processing terminal 10 set a unit of display on the basis of a recognition difficulty score to allow the unit of display to contain a maximum of 15 characters. Furthermore, the calculator 230 and the controller 120 of the information processing terminal 10 set, on the basis of a recognition difficulty score, the display intervals each ranging from 0.2 sec to 0.5 sec inclusive. As described above, with the information processing server 20 and the information processing terminal 10 according to the present embodiment, it is possible to more flexibly control displaying of a text in accordance with contexts of a user, an application, and a target text.

Furthermore, the calculator 230 and the controller 120 according to the present embodiment may set a display effect pertaining to a target text on the basis of a recognition difficulty score. Here, the display effect described above includes, for example a size, a color, a decoration, a font, and display positions of characters. Furthermore, the display effect described above may include converting of words contained in a target text. In the example case illustrated in FIG. 14, a unique noun SHINJUKU has been converted into uppercase letters. Furthermore, it is also possible in the calculator 230 and the controller 120 to convert a technical word known by a user into an abbreviated word, for example, to improve readability of a target text being displayed. Moreover, in a case where a target text is written in Japanese, it is also possible in the calculator 230 and the controller 120 to adjust numbers of Chinese characters, Katakana characters, and Hiragana characters to improve visibility and readability. Furthermore, the calculator 230 and the controller 120 may set a font in accordance with a number of characters contained in a unit of display to perform such control that gaps between characters are adjusted, for example.

Note that a unit of display, a display interval, and a display effect set by the calculator 230 and the controller 120 may be stored and reused by a user. Furthermore, it is also possible in the calculator 230 and the controller 120 to adjust a unit of display, a display interval, and a display effect on the basis of feedback entered by a user.

[[1.6. Flow of Processing]]

Figure 15:
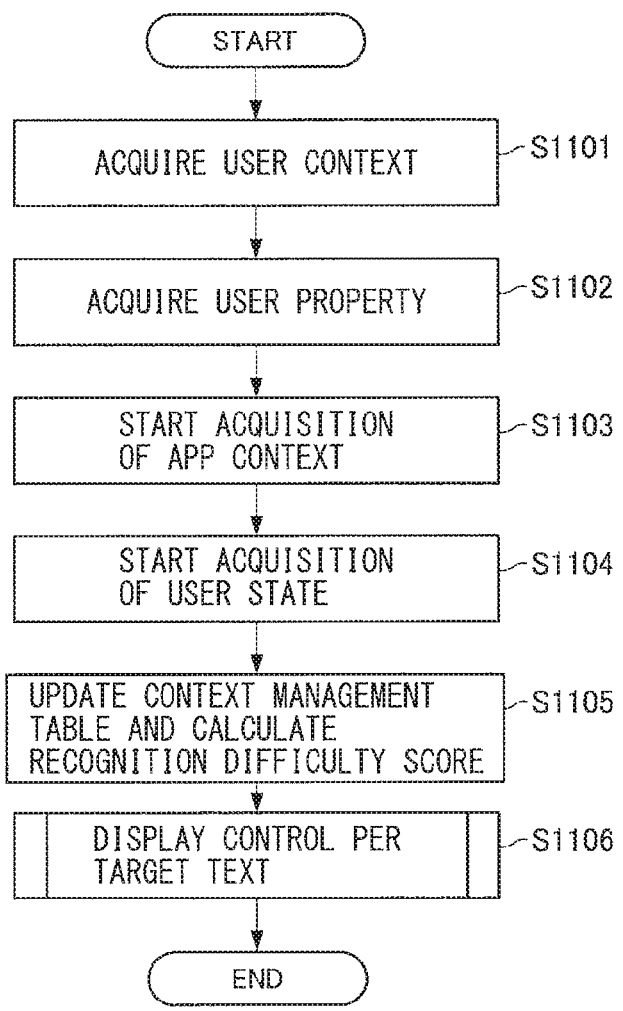
FIG. 15 is flowchart that illustrates a flow of an information processing method according to the embodiment.

Next, a flow of an information processing method achieved by the information processing server 20 and the information processing terminal 10 according to the present embodiment will be described herein in detail. FIG. 15 is a flowchart that illustrates the flow of the information processing method according to the present embodiment.

In the information processing method according to the present embodiment with reference to FIG. 15, acquisition of a user context is first executed (S1101). Acquisition of a user property is then executed (S1102).

Next, acquisition of an application context starts (S1103). Acquisition of a user state then starts (S1104). It is assumed that the application context and the user state be context data that may change within a relatively short period of time. In the information processing method according to the present embodiment, the two kinds of the context data described above are thus consecutively acquired. It is therefore possible to achieve more flexible display control of a target text.

Next, the context management table is updated on the basis of the context data acquired through steps S1101 to S1104. A recognition difficulty score is then calculated (S1105).

Next, display control is executed per target text on the basis of the recognition difficulty score calculated in step S1105 (S1106).

Figure 16:
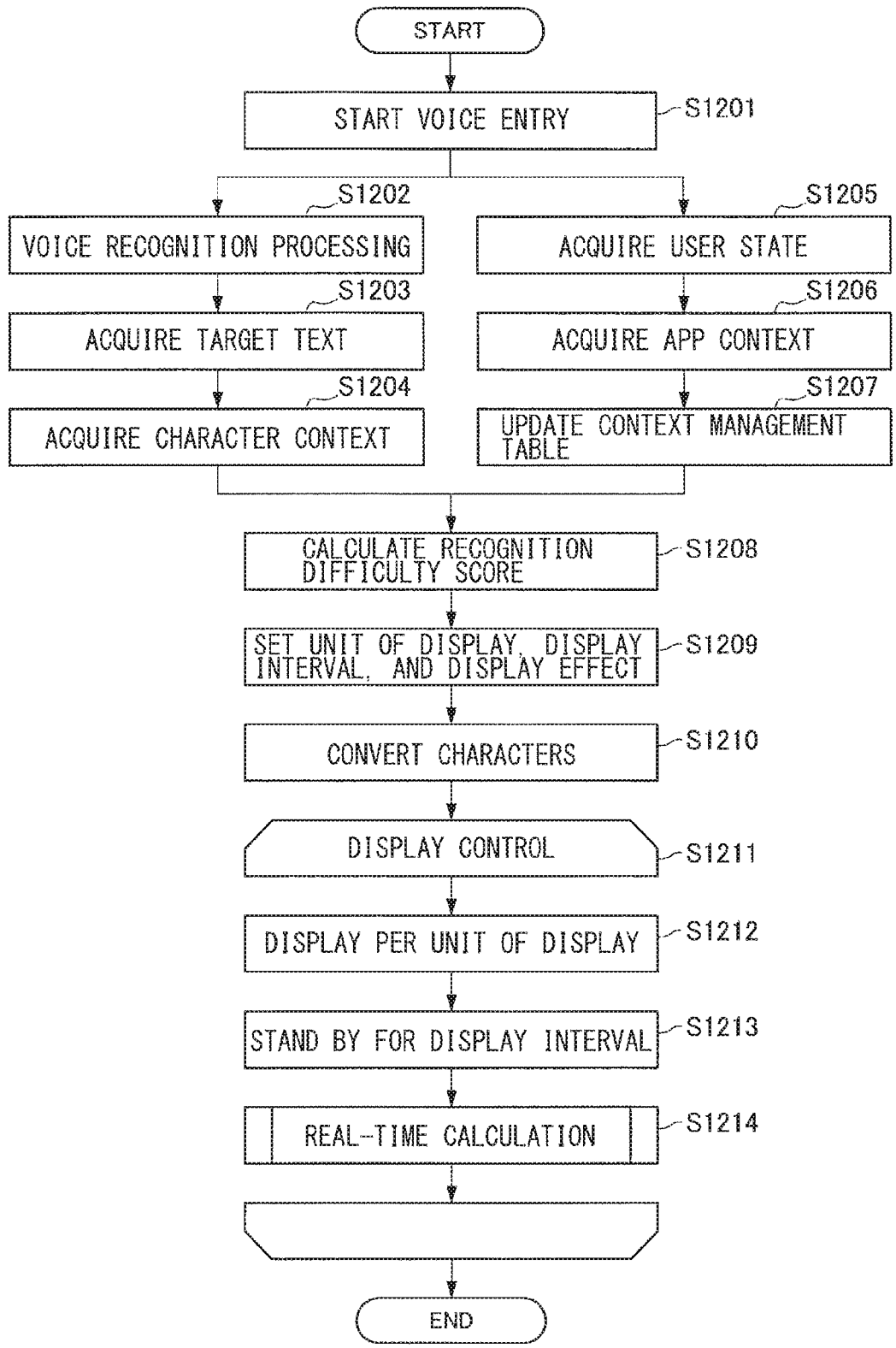
FIG. 16 is a flowchart that illustrates a flow of display control according to the embodiment.

A flow of the display control per target text in step S1106 will be described herein in more detail. FIG. 16 is a flowchart that illustrates the flow of the display control according to the present embodiment. Note that an example case is described herein, where the information processing terminal 10 and the information processing server 20 according to the present embodiment perform the display control pertaining to a target text to be acquired through voice recognition.

In the information processing method according to the present embodiment with reference to FIG. 16, a voice entry is first started (S1201).

Next, voice recognition processing is executed on the basis of a speech collected from a user (S1202). Acquisition of a target text is then executed (S1203). Furthermore, a character context is acquired on the basis of the target text acquired in step S1203 (S1204).

Furthermore, in parallel and consecutive to the processing pertaining to steps S1202 to S1204, acquisition of a user state is executed (S1205). Acquisition of an application context is then executed (S1206). Furthermore, update of the context management table is executed (S1207).

Next, the calculator 230 calculates a recognition difficulty score (S1208).

Next, a unit of display, a display interval, and a display effect pertaining to the target text are set on the basis of the recognition difficulty score calculated in step S1208 (S1209). Note that the processing described above is executed by the calculator 230 or the controller 120, as described above.

Next, characters of the target text are converted on the basis of the display effect set in step S1209 (S1210).

Next, the display control of the target text is executed on the basis of the unit of display, the display interval, and the display effect set in step S1208 (S1211).

In step S1211, the following tasks are repeatedly executed as long as a unit of display is present: performing displaying per unit of display on the basis of the set display effect (S1212), stand by for a period of time corresponding to the display interval (S1213), and calculation of context data in a real-time manner.

Figure 17:
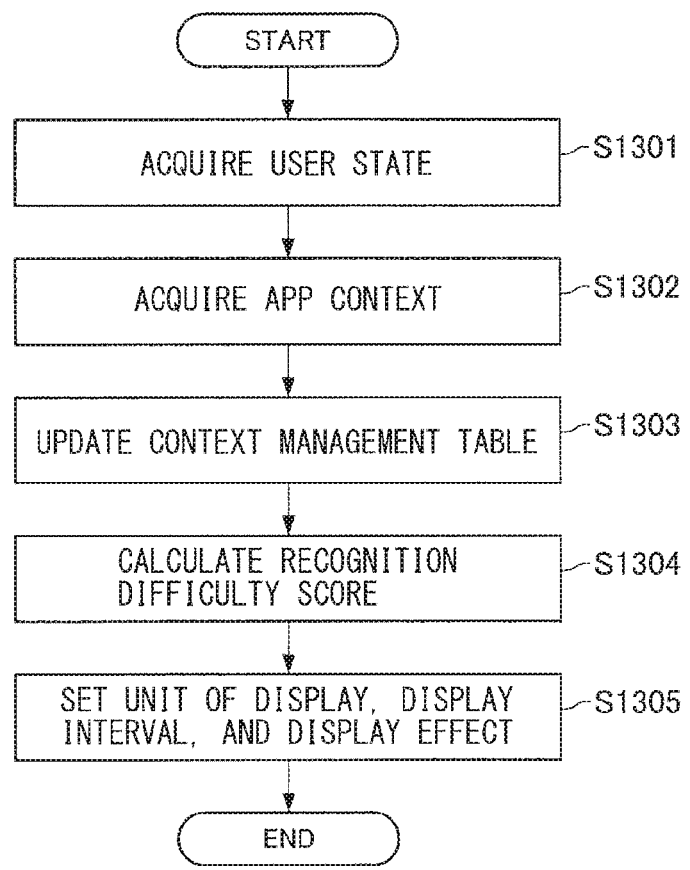
FIG. 17 is a flowchart that illustrates a flow of calculation of context data in a real-time manner, according to the embodiment.

FIG. 17 is a flowchart that illustrates a flow of calculation of context data in a real-time manner, according to the present embodiment. In the calculation of context data in a real-time manner according to the present embodiment with reference to FIG. 17, it is understandable that the following tasks are repeatedly executed in order: acquisition of a user state (S1301), acquisition of an application context (S1302), update of the context management table (S1303), calculation of a recognition difficulty score (S1304), and setting of a unit of display, a display interval, and a display effect. That is, it is possible in the calculator 230 according to the present embodiment to re-calculate a recognition difficulty score on the basis of context data to be entered while a target text is displayed. With the above-described function possessed by the calculator 230 according to the present embodiment, it is possible to achieve flexible display control in accordance with a change in context while a target text is displayed.

[[1.7. Application Examples]]

Next, application examples of the display control according to the present embodiment will be described herein. In the example case described above, the information processing server 20 and the information processing terminal 10 perform the display control of a target text to be displayed on a messaging application or a gaming application. However, the technical concept according to the present embodiment may be applied to various kinds of devices and applications.

The technical concept according to the present embodiment is applicable to a voice agent, for example. FIGS. 18A and 18B are diagrams that illustrate an example case where the technical concept according to the present embodiment is applied to a voice agent. FIGS. 18A and 18B illustrate the information processing terminal 10, the user U2 who is an elder person, and a user U3 who is a juvenile person. Here, the information processing terminal 10 may be a voice agent. The voice agent may have a schedule management function and a projection function. The voice agent thus makes a voice conversation with a user.

In a case where the user U2 gives a speech UO2 to ask for a registered schedule, as illustrated in FIG. 18A, for example, the information processing terminal 10 collects the speech UO2 and sensor information pertaining to a state of the user U2. The information processing terminal 10 then sends the speech UO2 and the sensor information to the information processing server 20. The information processing server 20 calculates a recognition difficulty score on the basis of the received information and stored information pertaining to the user UO2. The information processing server 20 further generates a target text T2 through voice recognition. Furthermore, the information processing server 20 may search for a schedule on the basis of the generated target text T2. The information processing server 20 may then synthesize an artificial voice to cause the information processing terminal 10 to give a system speech SO1.

Next, the information processing server 20 sends the calculated recognition difficulty score and the synthesized artificial voice to the information processing terminal 10. Next, the information processing terminal 10 sets a unit of display, a display interval, and a display effect for the target text T2 on the basis of the received recognition difficulty score. The information processing terminal 10 then causes the projection function to perform the display control of the target text T2. In the example case illustrated in FIG. 18A, the information processing terminal 10 displays the target text T2 with relatively greater characters at a position allowing the user U2 to easily recognize the target text T2, on the basis of the recognition difficulty score calculated on the basis of a position, a visual line, and an age, for example, of the user U2. Furthermore, the information processing terminal 10 outputs the system speech SO1 with the received artificial voice.

Furthermore, in a case where the user U3 gives a speech UO3 instructing registration of the schedule, as illustrated in FIG. 18B, the information processing terminal 10 similarly collects the speech UO3 and sensor information pertaining to a state of the user U3. The information processing terminal 10 then sends the speech UO3 and the sensor information to the information processing server 20.

Furthermore, similar to the case in FIG. 18A, the information processing terminal 10 executes the display control pertaining to a target text T3 on the basis of the generated target text and the calculated recognition difficulty score. In the example case illustrated in FIG. 18B, the information processing terminal 10 displays the target text T2 with a normal character size at a position allowing the user U3 to easily recognize the target text T2, on the basis of the recognition difficulty score calculated on the basis of a position, a visual line, and an age, for example, of the user U3. Note that, in a case where the information processing terminal 10 is provided with a directive microphone array and a directive antenna used to achieve a beam forming function, it is possible to further improve accuracy for input and output in accordance with a position of a user.

As described above, the technical concept according to the present embodiment is applicable to a voice and image agent simultaneously utilized by a plurality of users, for example. The calculator 230 according to the present embodiment may calculate, for this purpose, a recognition difficulty score on the basis of context data pertaining to a plurality of users. More specifically, it is possible in the calculator 230 according to the present embodiment to calculate a recognition difficulty score per user. With the above-described function possessed by the calculator 230 according to the present embodiment it is possible to achieve more flexible display control in accordance with a context per user.

Figure 19C:
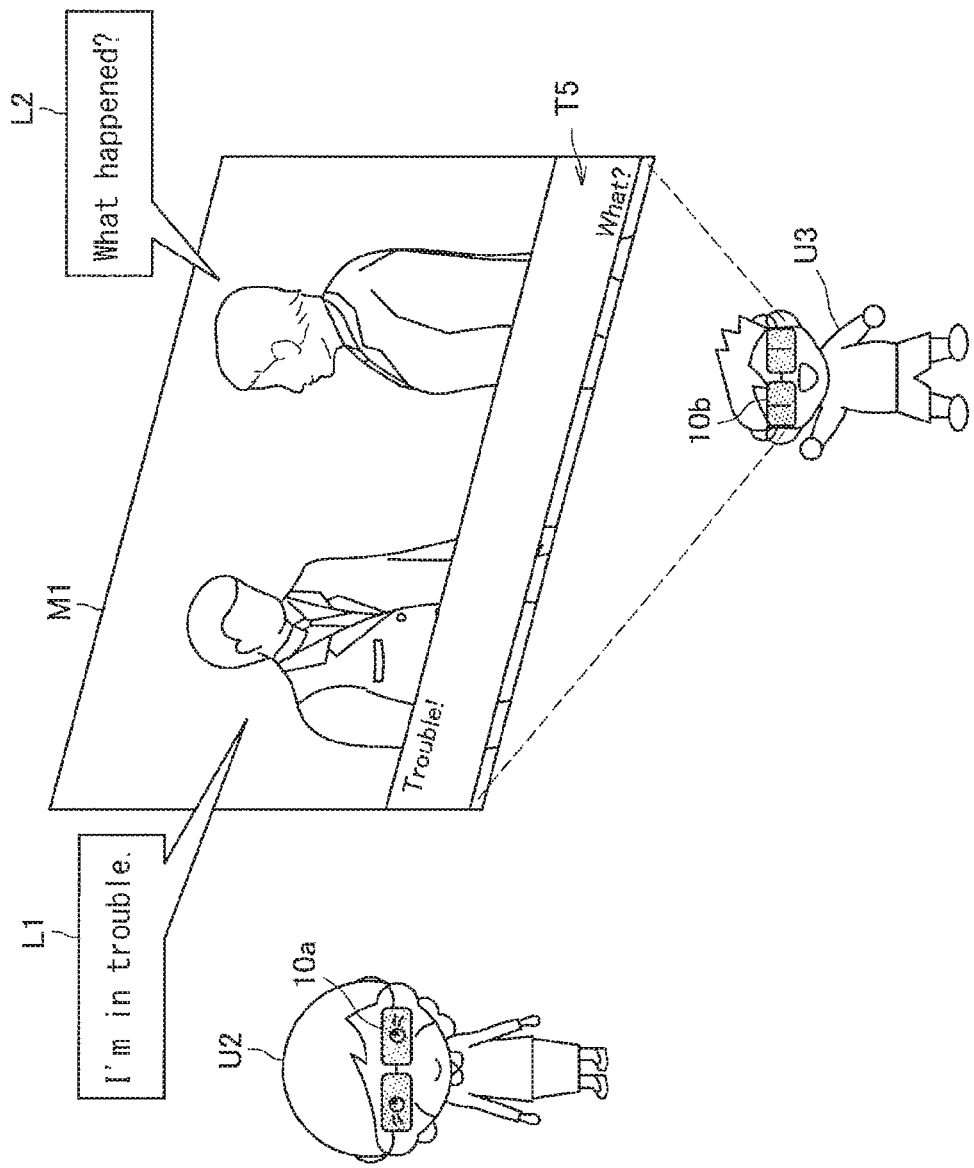
FIG. 19C is a diagram that illustrates the example case where the technical concept according to the embodiment is applied to the subtitle control.

Furthermore, the technical concept according to the present embodiment is applicable to a case where subtitles are to be output while a video such as a movie film is playing, for example. FIGS. 19A to 19C are diagrams that illustrate an example case where the technical concept according to the present embodiment is applied to a case where subtitles are to be output. FIGS. 19A to 19C illustrate a video M1 played on a display device or a similar device, the user U2 who is the elder person, and the user U3 who is the juvenile person. Furthermore, the users U2 and U3 respectively wear information processing terminals 10*a* and 10*b* that are eyeglasses type wearable devices.

Here, the information processing terminals 10*a* and 10*b* each have a function that controls displaying of subtitles pertaining to the video M1 through augmented reality (AR). The information processing terminals 10*a* and 10*b* may each have a function that displays, in a superimposed manner, subtitles prepared in a synchronized manner with the video M1 beforehand, for example. The information processing terminals 10*a* and 10*b* may each have a function that detects voice outputs corresponding to scripts L1 and L2 in the video M1 to display, in a superimposed manner, target texts, i.e., subtitles, recognized from the voice outputs.

In this case, the information processing terminal 10*a* worn by the user U2 sends sensor information pertaining to the user U2 to the information processing server 20. Furthermore, the information processing terminal 10*a* receives a calculated recognition difficulty score. It is therefore possible in the information processing terminal 10*a* to perform the display control of subtitles appropriate for the user U1. As illustrated in FIG. 19B, for example, the information processing terminal 10*a* may display a subtitle, i.e., a target text T4, with a character size that is easily recognizable by the user U2 who is the elder person.

Similarly, the information processing terminal 10*b* worn by the user U3 sends sensor information pertaining to the user U3 to the information processing server 20. Furthermore, the information processing terminal 10*b* receives a calculated recognition difficulty score. The information processing terminal 10*b* therefore performs the display control of subtitles appropriate for the user U3. As illustrated in FIG. 19B, for example, the information processing terminal 10 may display a subtitle, i.e., a target text T5. In the subtitle, a simple expression is used. The user U3 who is the juvenile person is thus able to easily recognize the subtitle.

As described above, the technical concept according to the present embodiment is applicable to various purposes. The technical concept according to the present embodiment may be applied to devices and applications each having one or more of a voice text entry function, a translation function, a minute generation function, an optical character recognition (OCR)-style character recognition function, and a voice control function, for example.

2. Hardware Configuration Example

Next, a hardware configuration example common to the information processing terminal 10 and the information processing server 20 according to the embodiment of the present disclosure will be described herein. FIG. 20 is a block diagram that illustrates the hardware configuration example of each of the information processing terminal 10 and the information processing server 20 according to the embodiment of the present disclosure. With reference to FIG. 20, the information processing terminal 10 and the information processing server 20 each include, for example, a central processing unit (CPU) 871, a read-only memory (ROM) 872, a random access memory (RAM) 873, a host bus 874, a bridge 875, an external bus 876, an interface 877, an input device 878, an output device 879, a storage 880, a drive 881, a coupling port 882, and a communication device 883. Note that the hardware configuration illustrated herein is merely an example. Some of the components may be omitted. Furthermore, other components than the components illustrated herein may be further included.

[CPU 871]

The CPU 871 functions as a computation processing device or a control device, for example. The CPU 871 wholly or partially controls how the components operate, on the basis of various programs recorded in the ROM 872, the RAM 873, the storage 880, or a removable recording medium 901.

[ROM 872 and RAM 873]

The ROM 872 is means that stores the programs to be read by and data to be used for computing by the CPU 871, for example. The RAM 873 temporarily or permanently stores the programs to be read by the CPU 871 and various parameters that appropriately change when each of the programs is executed, for example.

[Host Bus 874, Bridge 875, External Bus 876, and Interface 877]

The CPU 871, the ROM 872, and the RAM 873 are coupled with each other via the host bus 874. The host bus 874 allows high-speed data transmission, for example. The host bus 874 is further coupled, via the bridge 875, to the external bus 876, for example. In the external bus 876, a data transmission rate is relatively low. Furthermore, the external bus 876 is coupled to various components via the interface 877.

[Input Device 878]

The input device 878 includes, a mouse, a keyboard, a touch panel, buttons, switches, and levers, for example. The input device 878 may sometimes further include a remote controller that is hereinafter referred to as a rem-con. It is possible in the remote controller or the rem-con to utilize infrared light or another radio wave to send control signals. Furthermore, the input device 878 includes a voice input device such as a microphone.

[Output Device 879]

The output device 879 is a device that allows acquired information to be visually or auditory notified to a user. The device includes, for example, one, some, or all of a display device such as a cathode ray tube (CRT), an LCD, or an organic electroluminescence (EL), an audio output device such as a speaker or a headphone, a printer, a mobile phone, and a facsimile. The output device 879 according to the present disclosure further includes one of various kinds of vibrators that are able to output tactile stimulation.

[Storage 880]

The storage 880 is a device that stores various kinds of data. As the storage 880, a magnetic storage device such as a hard disk drive (HDD), a semiconductor storage device, an optical storage device, or a magnetic optical storage device is used, for example.

[Drive 881]

The drive 881 is a device that reads information recorded in the removable recording medium 901. Furthermore, the device writes information onto the removable recording medium 901. The drive 881 is, for example, a magnetic disc, an optical disc, a magnetic optical disc, or a semiconductor memory.

[Removable Recording Medium 901]

The removable recording medium 901 is one of various kinds of media, such as, a digital versatile disc (DVD) medium, a Blu-ray (registered trademark) medium, a hard disk (HD) DVD medium, or a semiconductor storage medium. Obviously, the removable recording medium 901 may be an integrated-circuit (IC) card mounted with a non-contact IC chip or an electronic apparatus, for example.

[Coupling Port 882]

The coupling port 882 is a port used to couple the externally coupled device 902. The coupling port 882 is, for example, a universal serial bus (USB) port, an IEEE1394 port, a small computer system interface (SCSI), an RS-232C port, or a photo-acoustic terminal.

[Externally Coupled Device 902]

The externally coupled device 902 is, for example, a printer, a portable music player, a digital camera, a digital video camera, or an IC recorder.

[Communication Device 883]

The communication device 883 is a communication device used to achieve a coupling to a network. The communication device 883 is, for example, a communication card conforming to a wired or wireless local area network (LAN), Bluetooth (registered trademark), or Wireless USB (WUSB), a router for optical communications, a router conforming to asymmetric digital subscriber line (ADSL), or a modem for various kinds of communications.

3. Summary

As described above, the information processing server 20 according to the present embodiment has the function that calculates, on the basis of context data to be entered, a recognition difficulty score used for display control of a target text. With the configuration described above, it is possible to achieve displaying of a text in a more flexible and highly readable manner in accordance with a situation.

The preferable embodiment of the present disclosure has been described in detail with reference to the accompanying drawings. However, the technical scope of the present disclosure is not limited to the pertaining examples. It is apparent that persons skilled in the technical field of the present disclosure may perceive various modification examples or correction examples within the scope of the technical concept as defined by the following claims. It should be appreciated that the various modification examples or correction examples obviously fall within the technical scope of the present disclosure.

Furthermore, the effects described in the present specification are for descriptive or exemplification purpose only. The effects are therefore not to be construed as limiting. That is, in addition to or instead of the effects described above, the technology according to the present disclosure may lead to other effects that are apparent to persons skilled in the art from the present specification.

Furthermore, the steps of the information processing method according to the present specification may not necessarily take place in a time-series manner in the order described in the flowchart. For example, the steps of the information processing method may take place in a different order than the order described in the flowchart. Or otherwise some of the steps may take place in parallel.

Note that such configurations as described below also fall within the technical scope of the present disclosure.

(1) An information processing device, including a calculator that calculates, on the basis of context data to be entered, a recognition difficulty score used for display control of a target text.

(2) The information processing device according to (1), further including a communicator that sends display control information used for the display control of the target text.

(3) The information processing device according to (2), in which the communicator sends the recognition difficulty score.

(4) The information processing device according to (2) or (3), in which
the calculator determines a unit of display, a display interval, or both, the unit of display and the display interval pertaining to the target text, on the basis of the recognition difficulty score, and
the communicator sends information pertaining to the unit of display, the display interval, or both.

(5) The information processing device according to any one of (2) to (4), in which
the calculator determines a display effect pertaining to the target text on the basis of the recognition difficulty score, and
the communicator sends information pertaining to the display effect.

(6) The information processing device according to any one of (2) to (5), in which the communicator sends a display control signal pertaining to the target text based on the recognition difficulty score.

(7) The information processing device according to any one of (2) to (6), in which the communicator sends the target text.

(8) The information processing device described in any one of (1) to (7), in which
the context data contains information pertaining to at least a state of a user, and
the calculator calculates the recognition difficulty score on the basis of the information pertaining to at least the state of the user.

(9) The information processing device according to any one of (1) to (8), in which
the context data contains information pertaining to at least an application context, and
the calculator calculates the recognition difficulty score on the basis of the information pertaining to at least the application context.

(10) The information processing device according to any one of (1) to (9), in which
the context data contains information pertaining to at least a user context, and
the calculator calculates the recognition difficulty score on the basis of the information pertaining to at least the user context.

(11) The information processing device according to any one of (1) to (10), in which
the context data contains information pertaining to at least a user property, and
the calculator calculates the recognition difficulty score on the basis of the information pertaining to at least the user property.

(12) The information processing device according to any one of (1) to (11), in which
the context data contains information pertaining to at least a character context, and
the calculator calculates the recognition difficulty score on the basis of the information pertaining to at least the character context.

(13) The information processing device according to (12), in which
the context data contains information pertaining to at least features of words contained in the target text, and
the calculator calculates the recognition difficulty score on the basis of the information pertaining to at least the features of the words.

(14) The information processing device according to any one of (1) to (13), in which the calculator re-calculates the recognition difficulty score on the basis of the context data to be entered while the target text is displayed.

(15) The information processing device according to any one of (1) to (14), in which the calculator calculates the recognition difficulty score on the basis of context data pertaining to a plurality of users.

(16) The information processing device according to (15), in which the calculator calculates the recognition difficulty score per each of the users.

(17) The information processing device according to any one of (1) to (16), in which the calculator generates a display control signal pertaining to displaying of the target text on the basis of the recognition difficulty score.

(18) The information processing device according to any one of (1) to (17), in which the target text is generated on the basis of a collected voice.

(19) An information processing method, including allowing a processor to calculate, on the basis of context data to be entered, a recognition difficulty score used for display control of a target text.

DESCRIPTION OF THE REFERENCE NUMERAL 10 information processing terminal
110 input section
120 controller
130 output section
140 server communicator
20 information processing server
210 audio analyzer
220 state analyzer
230 calculator
240 terminology DB
250 storage
260 voice synthesizer
270 terminal communicator

The invention claimed is:

1. An information processing device, comprising:
a voice detection device configured to detect a speech of a user;
a computer configured to process and convert the speech of the user into a target text;
circuitry configured to
calculate, on a basis of context data entered, a recognition difficulty score used for display control of the target text, and
set a maximum number of characters in each of units of display and a display interval between adjacent units of display pertaining to the target text on a basis of the recognition difficulty score, and
a display configured to display the target text with the units of display displayed with the display interval between the adjacent units of display pertaining to the target text,
wherein the context data comprises information pertaining to at least a state of a user, information pertaining to at least a user context, information pertaining to at least a user property, and information pertaining to at least application context.

2. The information processing device according to claim 1, wherein the circuitry is further configured to send display control information used for the display control of the target text.

3. The information processing device according to claim 2, wherein the circuitry is configured to send the recognition difficulty score.

4. The information processing device according to claim 2, wherein
the circuitry is configured to send information pertaining to the units of display, the display interval, or both.

5. The information processing device according to claim 2, wherein
the circuitry is further configured to determine a display effect pertaining to the target text on the basis of the recognition difficulty score, and
send information pertaining to the display effect.

6. The information processing device according to claim 2, wherein the circuitry is further configured to send a display control signal pertaining to the target text based on the recognition difficulty score.

7. The information processing device according to claim 2, wherein the circuitry is further configured to send the target text.

8. The information processing device according to claim 1, wherein
the context data contains information pertaining to at least a character context, and
the circuitry is configured to calculate the recognition difficulty score on a basis of the information pertaining to at least the character context.

9. The information processing device according to claim 8, wherein
the context data contains information pertaining to at least features of words contained in the target text, and
the circuitry is configured to calculate the recognition difficulty score on a basis of the information pertaining to at least the features of the words.

10. The information processing device according to claim 1, wherein the circuitry is configured to recalculate the recognition difficulty score on the basis of the context data to be entered while the target text is displayed.

11. The information processing device according to claim 1, wherein the circuitry is configured to calculate the recognition difficulty score on a basis of context data pertaining to a plurality of users.

12. The information processing device according to claim 11, wherein the circuitry is configured to calculate the recognition difficulty score per each of the users.

13. The information processing device according to claim 1, wherein the circuitry is configured to generate a display control signal pertaining to displaying of the target text on the basis of the recognition difficulty score.

14. The information processing device according to claim 1, wherein the target text is generated on a basis of a collected voice.

15. The information processing device according to claim 1, wherein the display interval is in a range of 0.2 second to 0.5 second, inclusive.

16. An information processing method, comprising: detecting a speech of a user; processing and converting the speech of the user into a target text; using circuitry, calculating, on a basis of context data entered, a recognition difficulty score used for display control of the target text and setting a maximum number of characters in each of units of display and a display interval between adjacent units of display pertaining to the target text on a basis of the recognition difficulty score; and displaying the target text on a display with the units of display displayed with the display interval between the adjacent units of display pertaining to the target text,
wherein the context data comprises information pertaining to at least a state of a user, information pertaining to at least a user context, information pertaining to at least a user property, and information pertaining to at least application context.

* * * * *